RADIO DIRECTION FINDER

Original Filed June 17, 1957 7 Sheets-Sheet 1

INVENTOR
GEOFFREY GOTTLIEB KRUESI.
BY
Morsa, Nolte, Crews + Berry.
ATTORNEYS.

RADIO DIRECTION FINDER

Original Filed June 17, 1957 7 Sheets-Sheet 2

INVENTOR
GEOFFREY GOTTLIEB KRUESI.
BY
Moses, Nolte, Crowe & Berry
ATTORNEYS.

RADIO DIRECTION FINDER

Original Filed June 17, 1957 7 Sheets-Sheet 3

INVENTOR
GEOFFREY GOTTLIEB KRUESI.
BY
Moore, Nolte, Crews + Berry.
ATTORNEYS.

RADIO DIRECTION FINDER

Original Filed June 17, 1957 7 Sheets-Sheet 4

INVENTOR
GEOFFREY GOTTLIEB KRUESI
BY
Moses, Mole & Mole
ATTORNEYS

RADIO DIRECTION FINDER

Original Filed June 17, 1957 7 Sheets-Sheet 5

INVENTOR
GEOFFREY GOTTLIEB KRUESI
BY
Moses, Molte, & Molte
ATTORNEYS

RADIO DIRECTION FINDER
Original Filed June 17, 1957 7 Sheets-Sheet 6
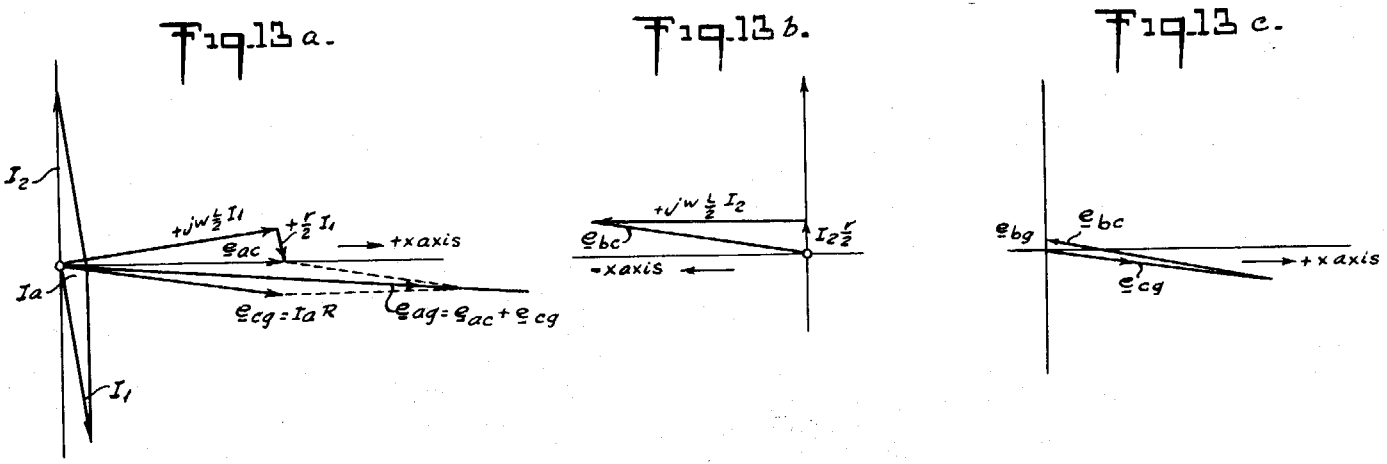
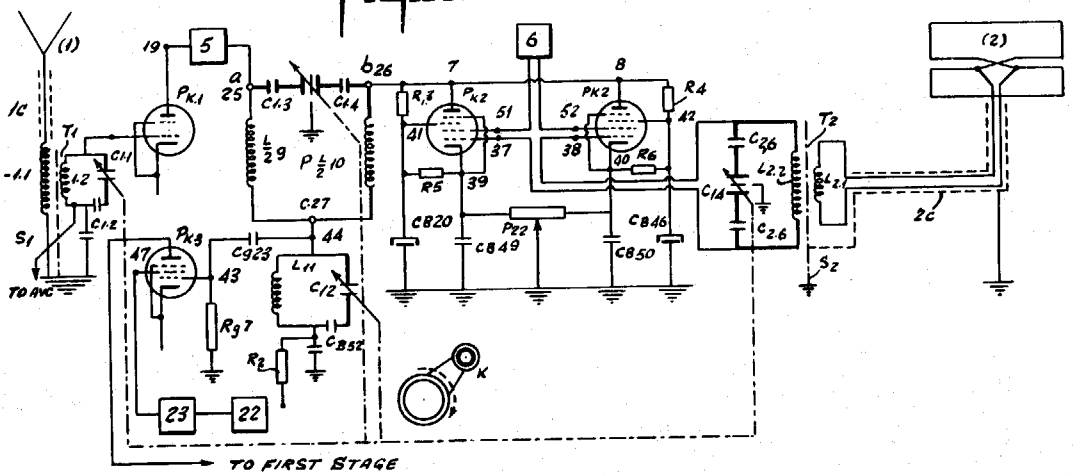
INVENTOR
GEOFFREY GOTTLIEB KRUESI
BY
Moses, Nolte, & Nolte
ATTORNEYS

RADIO DIRECTION FINDER

Original Filed June 17, 1957 7 Sheets-Sheet 7

INVENTOR
GEOFFREY GOTTLIEB KRUESI
BY
Moses, Mole, & Mole
ATTORNEYS

United States Patent Office

Re. 25,064
Reissued Oct. 24, 1961

25,064

RADIO DIRECTION FINDER

Geoffrey G. Kruesi, Los Altos, Calif., assignor of 10 percent to Albert C. Nolte, Sr., New York, N.Y.

Original No. 2,910,693, dated Oct. 27, 1959, Ser. No. 666,147, June 17, 1957. Application for reissue Apr. 6, 1961, Ser. No. 103,672

23 Claims. (Cl. 343—113)

Matter enclosed in heavy brackets [ ] appears in the original patent but forms no part of this reissue specification; matter printed in italics indicates the additions made by reissue.

This application is a continuation-in-part of my application Serial No. 269,218, filed January 31, 1952, now abandoned.

The present invention relates to high frequency (HF) and ultra-high frequency (UHF) direction finders in which a HF mixing circuit or coupling structure between directional and nondirectional antenna to a HF receiver-input, or collector circuit to visually and aurally determine two directions 180 degrees apart, respectively, of an incident radio wave, both visibly and aurally indicated in the respective signal output channels of an evaluation network associated with the collector circuit.

The operation of direction finders of this kind is described in Patent No. 1,868,945. There is at present an inability to properly identify the received aural signal under otherwise standard signal-to-noise ratio conditions at field strengths of the incident radio wave below the standardized, much too high values, varying from 25 to 50 microvolts/meter. Thus for a standard output signal in the visual amplifying channel 100 micro-amperes for a one degree deviation of the direction of the incident radio wave from the directional antenna's zero signal pick-up direction easily readable bearing directions are obtained with standard airborne antenna while any further decrease in field strength from the above standard values causes the aural signal to disappear in the receiver noise and local interference noise. The somewhat unusual phenomenon, otherwise loosely termed "frequency error" constitutes in other words an appreciable drop in sensitivity of the bearing indication because of the limit in operating range set by the lack of aural identification of the signals. The lack in sensitivity is particularly demonstrated by making a comparison between the above performance and that of standard communication receivers which, as is well known, give very satisfactory results at field strength values of only 5 microvolts/meter and less. Thus, briefly stated, the invention is concerned with improvements of the "aural performance range" by comparison with the "visual radio compass range," respectively, at much lower HF carrier signal inputs to the two amplifying networks to render the same signal outputs to the aural and visual amplifying channels of the receiving equipment.

The coupling structure has been found to be the major source of trouble. It was found that the best possible optimum coupling conditions in the coupling structure to produce an optimum maximum output signal in the visual amplifying channel of the receiver do not correspond with those that would be necessary for the best possible aural reception, unless "individual" manually performed tuning adjustments in the two antenna amplifying networks not only differing from each other, but also at each frequency over a given tuning range of the receiver proper, are resorted to. Such a procedure, however, being inconsistent with electro-mechanical "ganging" of the HF resonance-tuned circuits in the three networks by means of a single tuning drive is completely out of the question.

The invention eliminates an inherent electro-magnetic condition of constraint among the "total phase constants," $\alpha$, $\beta$, $\gamma$, respectively, of the non-directional and directional amplifying network and the collector circuit which requires the sum of these phase constants to remain constantly equal to 90 electrical degrees for every frequency inside a given frequency range. This electrical condition of constraint is a direct consequence of a magnetic condition of constraint among the three possible coupling coefficients in the currently used HF mixing transformers according to which the ratio of the product of any two of the coefficients to the third can never be made smaller than the numerical value of ½. If, as in the case of a single tuning drive, the individual phase constants of the three networks are left to themselves over a given frequency range, obviously, they cannot undergo a change unless this change is effected by the change in tuning constants of all three networks; the necessary degree of freedom required for any one of the three phase constants to vary independently from the other two being lacking.

This, by virtue of the elimination of the magnetic condition of constraint, accomplished by the elimination of one of the three "individual, generalized coupling pairs" considered in opposite directions of energy flow, renders the required additional degree of freedom to bring about highly desirable output terminal conditions in the two antenna amplifying networks by which an in-phase condition of the signal response functions in the collector circuit can be maintained over any given frequency range with the three networks electro-mechanically ganged. I am here referring to "symmetrical terminal conditions" as distinguished from the "asymmetrical terminal conditions" in the antenna amplifying networks of currently used radio compasses (right-O-left indicating instruments) and automatic radio direction finders 0° to 360° indicating instruments) which, in the presence of an unavoidable third shunt coupling in the coupling structure (HF three winding mixing transformer) are the reason for energy wasting circulating currents by which the HF carrier signal input to the two antennae has to be raised to give standard visual and aural channel outputs. Asymmetrical terminal conditions are also responsible for frequency variations of the amplitude of the combined antenna signal in the collector circuit over and above the natural frequency variations of the effective antenna heights.

Briefly summarized, establishing coupling conditions that are free from any constraining relation makes available the choice of symmetrical output terminal conditions of the antenna amplifying networks by which the variation over a frequency range of the signal response function of one antenna amplifying network may be made equal to that of the other considered in the direction of energy flow. In addition, feedback reactions of the combined signal in the collector circuit are prevented in said output terminations by uni-laterially conducting active, or, passive circuit elements with symmetrical electrical characteristics. Thus, any energy exchange between the HF input circuits over and, respectively, via the antenna amplifying networks and the collector circuit is effectively stopped. This then, constitutes the fundamental requirement for the obtainment of symmetrically varying signal response functions in the collector circuit over quite extended frequency ranges. As a special selection of phase constants of the antenna networks are those whose difference remains constantly 90 degrees consistent with rendering optimum maximum antenna signal amplitudes in the collector circuit. This means that because of the compensated 90 degree phase difference between the antennae E.M.F.'s the said signal response functions add up "algebraically" and consistently over a frequency range. If, as is usual practice, the signal amplitudes in the maximum signal pick-up direction of the directional antenna are made approximately equal, the combined antenna signal in the collector circuit has a frequency independent cardioid receiving characteristic.

This frequency independent performance has opened up possibilities to raise the operating frequencies into the 100 to 1000 megacycles and radar frequency regions so that novel applications of the present direction finder principle of coupling two antenna amplifying networks to a collector circuit, related to the Ilas, Vor, Tacan and Vortac instrument landing and airtraffic control systems are made possible.

An entire variety of coupling structures of, both, the inductive types (separate systems) and the direct coupled types (single physical systems) are made possible by the present invention. In fact, the electrical behavior of all the various coupling structures about to be enumerated is quite analogous to that of two co-axial cables, transmission lines or wave guides energized at the input ends with a source of energy each, respectively, 90° phase displaced, having physical lengths differing electrically by 90 degrees and a common output termination with an impedance equal to the "characteristic" impedance of an infinite transmission line. Such an arrangement will also result in the total absence of "reflected energy" back into the two transmission lines and permit the independent flow of energy in each line toward the common output termination.

Of the above single physical systems which this invention makes possible there are three classifications of HF circuitry, as follows:

(A) balanced parallel - input antenna networks with respect to a HF receiver-input or collector circuit, correcting for frequency errors, respectively, "ahead" of the point of coupling or collector circuit. These may include coupling structures of the inductive type of separate systems.

(B) balanced parallel input antenna networks not including coupling structures of the inductive type and, respectively, correcting for frequency errors "after" said point of coupling.

(C) balanced orthogonal-input antenna networks, such as bridge-adding networks.

All of the above coupling structures are typical of means to prevent any energy exchange between the input terminations of the antenna amplifying networks in opposite directions of energy flow, respectively, that could take place over said amplifiers and the point of coupling. If we denote the coupling coefficients between the said output terminations of the nondirectional network I, the directional network II and the collector circuit III with ($k_{12}=k_{21}$), ($k_{13}=k_{31}$) and ($k_{23}=k_{32}$) it is found that in eliminating the coupling coefficient $k_{12}=k_{21}$ by either a special three winding transformer construction, or, by devising coupling systems as noted under classifications, (B) and (C) above the constraining relation among the phase constants, $\alpha+\beta+\gamma=\pm 90°$ reduces to a simpler one, called the "principal requirement": (mm) $\beta-\alpha=\pm 90°$=constant over a given frequency range, so that the phase constants, $\alpha$ and $\beta$, either by reason of a source frequency variation with constant antenna network parameters, or, by reason of network parameter variations with a constant source frequency, can be made to vary independently from each other and the phase constant, $\gamma$, of the collector circuit.

Thus, the principal requirement (mm) is dependent upon the achievement of the following "functional requirement," insofar as best possible performance is concerned:

In this connection the condition (mm) states in practical language, that the frequency variation of one phase constant may be made equal to that of the other; i.e., a positive (+) increment, $\Delta\beta$, of a positive (+) phase constant $\beta$ during a frequency variation, $\Delta f$, may be made equal to a positive (+) increment $\Delta\alpha$ of a negative (−) phase constant, $-\alpha$.

The second stipulation in the functional requirement (I) states in practical language that, over a given frequency range, say, the voltage ratio in the maximum signal pick-up direction of the directional antenna between the sense antenna voltage response at the point of coupling, and the sense antenna input voltage of its network, will be equal to a corresponding voltage ratio between the directional antenna voltage response at said point of coupling and the directional antenna input voltage of its network.

Simultaneously therewith, the first stipulation in the functional requirement (I) states in practical language that, over a given frequency range, say, the voltage ratio, respectively, between the voltage response induced in one network (considered passive) and the voltage source at the input of the other network (considered the active network) must remain zero, while the passive receiver network is considered de-coupled or open-circuited in both cases.

Since we denote with $\alpha$ and $\beta$ the phase constants of the active antenna networks including the coupling structure, respectively, from the input nodes to the point of coupling and as such represent the phase functions of the respective system functions, it becomes clear that ($\beta-\alpha$), the difference which according to (mm) is required to remain constant, relates also to the said common point of coupling, irrespective whether this common coupling point resides in the output termination of network I, or in that of the loop network II, or, in the input termination of the passive network III of the receiver. The stipulated 90° difference between $\beta$ and $\alpha$, in fact, is wholly due to an identical difference between the phase constants of the voltage or current sources (sense and loop antenna).

A few remarks will be made in regard to practical precautions that must be taken when designing single systems of the classifications (A), (B) and (C). In particular the remarks are related to a specific embodiment insofar as they are related to a particular embodiment of this invention belonging to the classification (A) of "separate" systems. For this reason this first, particular embodiment will be briefly described:

This embodiment is a high frequency H.F. mixing transformer, in which one of the mutual coupling coefficients $k_{12}$, $k_{13}$, $k_{23}$ can be made to vary, independently from the other two, "equalized," coupling coefficients, respectively, from a positive (+) value, over a "zero" value, to a negative (−) value. The condition of constraint is removed at the precise moment when a certain (+) value of the mutual inductance corresponding with the variable coupling coefficient just suffices to counteract the (−) value of the mutual capacitance in parallel with the (+) mutual inductance. If the point of coupling resides in the passive collector circuit III, therefore, there are two symmetrically disposed equalized coupling coefficients, $k_{13}$, $k_{23}$ which remain between network III, respectively, and the output terminations of networks I and II. Exclusively for this case, then, the circuit arrangement may be compared with the method of operation of single systems, classified under (A) above. But, it cannot be strongly enough emphasized, that in this particular system the distributed stray capacitances between the active networks I and II are "neutralized" ahead of the common point of coupling in network III.

There are single systems of the classification (B) known in electronic computer engineering as "adding circuit" which strive to eliminate the stray capacitances between voltage sources that must be added. The voltage sources are each connected in series with "balanced" resistors, respectively, terminating into a common grid input of a negative feedback amplifier of the "plate follower type," the idea being, to counteract the said mutual stray capacitances by the negative feedback action after the common point of coupling (grid input of the negative feedback amplifier) and, respectively, prior to the receiver input which amplifies further the "added" voltages.

A second embodiment of this invention, therefore, consists of a high frequency input system for radio direction finders of the class described, in which said series resistors are replaced, respectively, by combinations of the said resistors connected to the outputs of the antennae networks in series, terminating, with the respective outer ends of said resistors connected together, into a common point of coupling, prior to applying said negative feedback principle.

A third embodiment of this invention belonging to the classification (A) of single systems consists of a coupling structure which is quite similar to the operation of the mentioned first embodiment of this invention except that no mutual inductances are employed. The elimination of the undesirable system function is again taken care of "ahead" of the common point of coupling. The coupling structure is the "dual" of that of the first mentioned embodiment of this invention; i.e., the function of the "remaining" equalized coupling coefficients $k_{31}=k_{32}$ is taken over, instead of by mutual inductances, by equalized self inductances having an R.F. resistance in common. The joined inner ends of these two equal coil halves form with the ground a node pair across which is connected the collector network, while the outer ends of the two coil halves connect to a differential variable tuning condenser and, respectively, to the high potential nodes of the output terminations of the active antenna networks I and II. At the resonance setting of the differential condenser the voltage drops across the node pair of the collector circuit III, and the one developed across the circuit branch comprising one of the coil halves connecting to the passively assumed high potential end of one of said output terminations (while the other high potential end is considered actively energized by the other antenna network) can be made equal and phase opposed, so that the system function in either direction between the antennae networks become zero This zero condition includes the presence of all capacitive stray couplings between the two antenna networks, because they are comprised (in parallel with the differential condenser) in the resonance tuning setting of the differential condenser, and this, at each and every frequency over the tuning range of the receiver.

A fourth specific embodiment of this invention, also belonging to the classification (A) of single systems, relies upon the rendering ineffective of the undesired system function between the antenna networks, respectively, before the common point of coupling, by a "brute force" method of overcoming the effects of mutual stray capacitances between the active networks in a "differential amplifier" modified to operate at radio and very high (V.H.F.) frequencies.

A fifth specific embodiment of this invention, again beloging to the classification (A) of single systems relies upon the rendering ineffective of the undesired system function, respectively, before the common point of coupling, by the use of a balanced cathode follower circuit prior to the common point of coupling to the node pair of the receiver network III. It is again, at best, called a "brute force" method. The grid-input capacitances (equalized) between the two grid nodes and ground, and, respectively, between said grid nodes and the common cathode terminal form the two couplings $k_{31}$ and $k_{32}$ between the collector network III and, respectively, the high potential ends of the output terminations of the active antenna networks I and II. By the cathode follower action said input capacitances are greatly reduced, hence, any mutual coupling between the active networks is confronted with a consequential high impedance in series therewith before the common point of coupling, which is the common cathode circuit in parallel with the receiver input network III.

A sixth specific embodiment of this invention, belonging to classification (B) of single systems eliminates the undesired system function indicated by the functional requirement (I) is initially removed by coupling the output terminations of the active antenna networks, respectively, in orthogonal fashion, to the two node pairs of an "equal arm bridge circuit." Mutual stray capacitances between the active antenna networks I and II which ordinarily will introduce a frequency error function may thus be counteracted by adequate unbalancing of the bridge network, thus creating a corrective frequency error function which opposes the former. Balancing a bridge network of this kind, and keeping said balance over a frequency range is in a way comparable with the establishment of a symmetrical circuit design of the active antenna networks I and II on the one hand, and the removal of constraint among the three coupling coefficients, such as in the case of the first specific embodiment of this invention.

It is particularly emphasized that the present invention does not confine itself to the specific deficiencies of any one single element in the above enumerated circuit systems, but rather is concerned with the "general relationships" between all of the elements which lead to the undesirable frequency error between the response functions in the systems. Practical circuit evaluation, therefore, must touch upon:

(1) Symmetry of the equivalent network parameters, as represented by the individual system functions, or, as we have called them: generalized, individual couplings, respectively, referred to a common point of coupling between two of the three networks I, II and III, and the input node pairs of the voltage or current sources in the systems (sense and loop antenna).

(2) The possibilities of the elimination, or, otherwise rendering ineffective the individual system function between the active antenna networks I and II in the two opposite directions of antennae energy flow (generalized, individual coupling pair) either, before, or, after the common point of coupling in the system, and, furthermore, maintaining this condition over an extended frequency range.

(3) In conformity with (1) above, the attainment of an even energy distribution in the system (see second stipulation of the functional requirement (I) above).

(4) Making the total current losses in the high frequency input system of an optimum minimum which fact will result in optimum maximum response functions at the common point of coupling corresponding with an optimum maximum turn-indicator sensitivity over the range, as given by the principal requirement (mm).

The general design rules enumerated under paragraphs (1) to (4) above are found to be equally applicable to sinusoidal driving and response functions and transient, non-periodical driving functions (time modulated radio transmissions).

Other objects and advantages of the novel invention and systems will become apparent, and the invention will be fully understood from the following description and drawing, in which:

FIGS. 13a, 13b and 13c represent vector diagrams in connection with the operation of the coupling structure of FIG. 13;

FIG. 14 shows a schematic wiring diagram of a coupling structure using the principle of operation given by FIGS. 13*a*, 13*b* and 13*c*;

Figure 1:
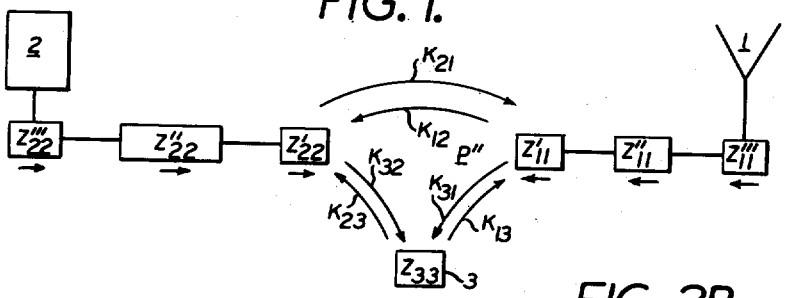
FIG. 1 is a diagrammatic representation of a directional antenna network and a non-directional antenna network coupled to a common receiving device by means of a coupling structure (P″) with two inputs and an output showing the three possible bilateral (assumed inductively coupled) coupling paths between each of the three possible combinations of two networks.

FIG. 1 shows a conventional high frequency input system of a radio direction finder of the class described in block form, consisting of two "active" antenna networks I and II, respectively, connected at their input terminations to the sense antenna 1, and a directional antenna 2, and a "passive" network III (designated with $Z_{33}$, the input impedance of the collector circuit 3). All conventional high frequency input systems of this kind are "mechanically and electrically ganged," i.e., high frequency resonance-tuned circuits in the three networks may be "tuned" to the operating frequency of the incident radio wave by means of a single mechanical control, or, by means of an electrical remote control device (not shown).

Between the output terminations ($Z'_{11}$, $Z'_{22}$) of the active networks I and II and the passive networks III is a "coupling structure" P″ merely indicated by three mutual inductances as represented by the coupling coefficients, $k_{12}$, $k_{21}$; $k_{13}$, $k_{31}$; $k_{23}$, $k_{32}$.

The already referred to magnetic condition of constraint among these coupling coefficients is, symbolically expressed, as follows:

$$\text{(ii)} \qquad K_{12}^2+k_{13}^2+k_{23}^2 \gtreqless 1+2.k_{12}.k_{13}.k_{23}$$

which relation, in turn, leads to a physical limitation among the ratios of "shunt-to direct coupling effects,"

$$\text{(jj)} \qquad \frac{k_{32}.k_{21}}{k_{31}}=\frac{k_{12}}{\frac{(k_{31}.k_{12})}{k_{32}}}\geq\frac{1}{2}$$

i.e., no matter what is tried in the way of changing the number of turns, or, the lengths of reluctance paths of the magnetic circuit of a three winding mixing transformer, or, with two single, two winding transformers in which a third capacitive shunt coupling is present between at least two of the transformer windings, a residual third shunt coupling will always remain and thus bring all three coupled networks into mutual relationships. Hence, at no time is it possible to eliminate shunt coupling effects, as indicated by the products, $k_{32}.k_{21}$, or, $k_{31}.k_{12}$, of the above expression (jj).

If I designate the gains of the active networks, respectively, from the antennae input circuits to the point of coupling to collector network 3 and in the opposite direction of energy flow from network 3 to said input circuits with "individual generalized coupling pairs" considered in opposite directions of energy flow, it is readily seen that, since the above ordinary coupling coefficients must be contained therein, the foregoing conclusions derived as to the inability of separating the networks from each other must hold true likewise for said generalized coefficients or individual system functions which, when multiplied with the respective driving functions result in the "individual response functions." These coefficients we shall distinguish in pairs, thus:

$(K_{12}, K_{21})_{,+jw}$, respectively, between networks 1 and 2, $(K_{13}, K_{31})_{,+jw}$, between networks 1 and 3, and, $(K_{23}, K_{32})_{,+jw}$, between networks 2 and 3. The phase functions of these coefficients we have already referred to as the angles, $\alpha$, $\beta$, and $\gamma$, of networks 1, 2 and 3, while the amplitudef unctions are written thus:

$$(K_{12}, K_{21})_{,+jw}, \text{ etc.}$$

The "total gain" of the two networks 1 and 2, as measured at the point of coupling, respectively, with only one driving function (antenna E.M.F.) active in the mutually coupled total system of networks 1, 2 and 3, we designate with: $K^t_{31}$, considered in direction from the antenna 1 to the point of coupling 3, and $K^t_{32}$, considered in direction from the antenna 2 to said point of coupling 3. They must, therefore, be some sort of an algebraic expression, as we shall see later in this specification, indicating a general relationship among all of the above individual system function pairs.

Each of the antennae 1 and 2 is characterized by a driving function (E.M.F.) which produces a response function, or, a response signal across the input nodes of the network III, and it is the purpose to obtain response functions which, in the maximum signal pick-up direction of the directional antenna 2, are of equal, "phase aligned" amplitudes, respectively, over a given operating, or, "tuning range" of the collector circuit 3. Expressed in other words: the "amplitude and phase functions" of the two response signals must have "identical frequency responses" the respective curves of which run parallel with each other. If the amplitudes remain equal and phase opposed (or phase aligned) in said loop direction over a frequency range, the true "algebraic addition" of said response signals results as we shall see, in a cardioid receiving characteristic.

The directional antenna 2 may consist of a loop, if the operating range is in the long wave and broadcast frequency spectrum of 100 to 1750 kilocycles, or it may consist of an antenna array of the Adcock, or, Franklin types, if the operating range is in the V.H.F. and U.H.F. spectrum of 100 to 1000 megacycles, commonly employed in the Vor-Dem, Tacan and Vortac airtraffic control-and the Ilas instrument landing systems now in use, or proposed in this country. Either type of antenna 2 has a driving function, i.e., and E.M.F.

$$E_2=E_2\cdot\sin(w.t.).e^{+j(\phi 1-90)}.\cos(\delta)$$

in which the angle of rotation of the directional antenna structure 2, respectively, $\delta=0°$ and $+180°$ is defined to be lying in the maximum signal pick-up direction, being "normal" to the frontal area represented by the directional antenna conductors. This normal direction coincides with the minimum signal pick-up direction of the antennae for which the angle $\delta$ is equal to, respectively, $\delta=+90°$ and $+270°$. For this reason the normal direction is called the directional antenna's "zero," or, "symmetry" axis. The angle, $\phi_1$, denotes the "time reference phase" which, as we shall see, coincides with that of the driving function, or, E.M.F. $E_1$, of the non-directional sense antenna 1.

The directional antenna 2, furthermore, is characterized as having an "internal impedance," $Z^0_{22}$, and feeds, over a high frequency feeder cable (not shown) an input coupling stage, $Z'''_{22}$, an intermediate coupling stage, $Z''_{22}$, and the output stage, $Z'_{22}$. The chain of coupling stages is called the "directional antenna amplifying network" and is designated with II. The stages are supposed to operate in true series fashion in which it is assumed that no individual shunt, or, feedback couplings between said stages will interfere with a true series operation of network II.

The above symbolic expression for the E.M.F. $E_2$ shows the directional receiving characteristic to be that of a "lemniscate," and it is further seen, that the phase of the induced E.M.F. $E_2$ changes its sign from (+) to (−) when the direction, $\delta$, passes through the value, 90°, and that said phase changes its sign, respectively, from (−) to (+), when it passes through the value of +270°, assuming in both cases the same sense of rotation. I speak, therefore, of a positive and a negative 180° "phase reversal," respectively, in the +90° "forward," and, in the +270° "rear" direction of the incoming radio wave.

The "non-directional" antenna 1 has a driving function, or, induced E.M.F. $E_1$ with its internal impedance $Z^\circ_{11}$ (not shown). Its symbolic expression is given by:

$$E_1=E_1\cdot\sin(\text{w.t.})\cdot e^{+j(\phi_1)}$$

in which the phase angle of $\varphi_1$, is the already mentioned reference time phase. It is seen, that the receiving characteristic of this antenna does not change its sign, or, polarity, with respect to the direction, $\delta$, of the incident radio wave. The said characteristic is usually assumed to be circular in shape, although any such statement should be regarded with precaution in the case of airborne antennae. As a rule a wire-or mast antenna is used in the case where the wind drag on medium speed, medium performance aircraft does not result in excessive mechanical vibrations, while, on high speed, high performance aircraft counter-sunk capacity plate antennas are used, properly insulated from its supporting frame which, in turn, is flush mounted with the aircraft's fuselage. The antenna 1 is fed, again over a high frequency feeder cable (not shown) a chain of series connected coupling stages, i.e., the input coupling stage, $Z'''_{11}$, the intermediary coupling stage, $Z''_{22}$, and the output stage, $Z'_{11}$. Identical considerations hold with respect to the series operation of this network, denoted with "non-directional antenna amplifying network I."

If each of the output terminations of $Z'_{11}$, $Z'_{22}$ and the input termination of $Z_{33}$ in FIG. 1 consist of the physically "separate" coils of a three winding H.F. mixing transformer usually employed in the conventional high frequency input system, we are not necessarily entitled to call such a system a "separate system of coupled networks" because of the individual character of "mutual inductances" between them. This is because of capacitive "elements" which are not noted in FIG. 1, and which may exist in the form of distributed capacity, inside the chassis of the direction finder, of which "equivalent lumped capacitive elements" may be thought of as lying in parallel to said individual mutual inductances, as expressed by the coupling coefficient pairs, $k_{12}$,$k_{21}$; $k_{13}$,$k_{31}$; $k_{23}$,$k_{32}$. Especially in the case as in modern three winding H.F. mixing transformers, wherein said mutual inductances are relatively small and comparable in magnitude of the antennae capacitances of antenna 1 and 2, the influence of these capacitive "shunt" elements may seriously affect the operation of the coupling structure in a manner not ordinarily anticipated by the looks of the wiring diagram of the high frequency input system.

Figure 12:
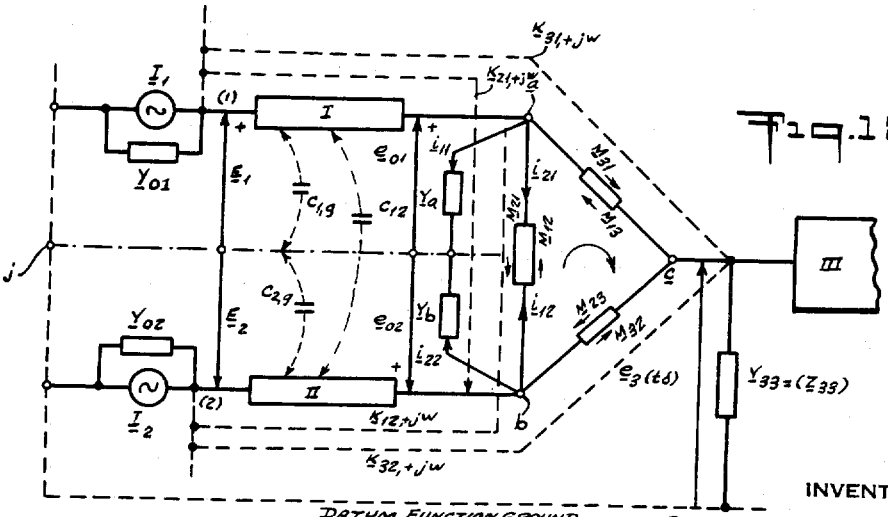
FIG. 12 shows an equivalent mathematical "dual circuit" of the coupling structure between the three networks shown in FIG. 1.

However, it is possible to form from the network configuration of FIG. 1 with the assumption that only mutual inductive couplings are present in the coupling structure, a "dual" coupling network such as shown in FIG. 12. The mutual inductances are "inverted" thereby, and so are the self inductances of the three transformer coils. The inverted inductances receive the character of ordinary circuit elements which may now be "added" to said equivalent lumped capacitive elements, ordinarily not indicated on circuit diagrams. Mathematically it is the "admittances" which may now be added together, to result in the admittances $M_{12}=M_{21}$, $M_{13}=M_{31}$ and $M_{23}=M_{32}$ that are seen to be "bi-lateral" in character because the coupling structure is of a passive nature, there being neither voltage nor current sources comprised in these admittance branches.

They are "frequency dependent" and so are the corresponding coupling coefficients which, for this reason I now denote with, $(k_{12}=k_{21})_{+jw}$, $(k_{13}=k_{31})_{+jw}$ and $(k_{23}=k_{32})_{+jw}$, since they can, generally, be expressed as the negative reactance of elastances:

$$\frac{-j}{w}(L_jL_i-m^2_{ij})$$

while the respective positive capacitive reactances may be expressed in the form: $+j.w.C_{ij}$. If we ascribe an R.F. resistance to the coil inductances of the transformer windings, say, $R_i$, $R_j$ we may put the corresponding conductance, respectively, in parallel with the other two elements and obtain for the value $M_{ij}$, as the total admittance between nodes, i and j, in general, the symbolic expression:

$$\text{(nn)}\qquad M_{ij}=M_{ji}=G_{ij}+j.w.C_{ij}-\frac{-j}{w}(L_iL_j-m^2_{ij})$$

in which $$G_{ij}=(R_{ij})^{-1}$$

and, $w=2\cdot\pi\cdot f$ the angular velocity of the radiated wave of frequency f.

FIG. 12 represents a mathematical equivalent of the high-frequency input system of FIG. 1 and may be analysed in accordance with standard methods found in text books (see Gardner & Barnes, "Transients in Linear Systems" vol. 1, John Wiley & Sons, Inc., New York). The mathematical equivalent is seen to have current sources $I_{01}$ of the sense antenna 1, and $I_{02}$ of the directional antenna 2, with their "internal admittances, respectively $(Z^\circ_{11})^{-1}$ and $(Z^\circ_{22})^{-1}$ while the output admittances of the active antenna networks denoted in block form with I and II, are indicated with $Y_a$ and $Y_b$. The common point of coupling, node c represents together with the common datum junction (dash-dotted line) the input node pair to the collector circuit of network III.

Figure 9A:
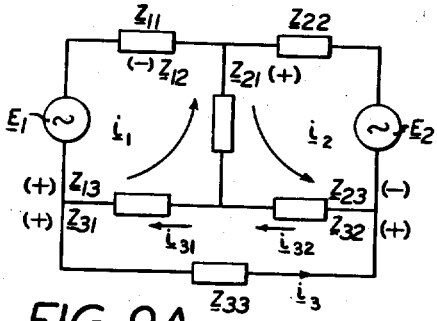
FIG. 9 shows a generalized equivalent "double-dual" circuit of the circuit arrangement shown in FIG. 1.

The final analysis, however, is based on the "loop method" which necessitates forming a mathematical "dual" of the network configuration of FIG. 12 into that shown in FIG. 9A. The analog is seen to have three independent geometrical loops with the currents, $$I_1=i_{11}+i_{12},\ I_2=i_{21}+i_{22}\ \text{and}\ I_3=i_{31}+i_{32}$$

flowing therein, respectively, as the independent variables, two voltage sources $E_1$, $E_2$ already referred to as the sense and directional antenna E.M.F.'s respectively, the individual transfer impedance $Z_{11}$, $Z_{22}$ of the active networks I and II, the input impedance $Z_{33}$ of the passive network III (collector circuit) and the mutual impedances, $z_{12}=z_{21}$, $z_{13}=z_{31}$, and $z_{23}=z_{32}$ (the internal antennae impedances $Z^{\circ}_{11}$, $Z^{\circ}_{22}$ are included [included] in said transfer impedances $Z_{11}$, $Z_{22}$, but not shown).

The mutual impedances no longer have the significance of the former "mutual inductances" above referred to since they are the duals of the said total admittances $M_{ij}$ as given by the definition (nn) above.

Referring now to FIG. 12, the initial assumption will be made that only the current source $I_1$ is active, while the current source, $I_2 \cdot \cos\delta$, is inactive and replaced by its internal admittance, $Y_{02,+jw}$. Network II is, therefore, passive and network I active. There will then be a signal voltage, say, $e^t_{31,+jw}$ appearing between junction c and ground. We define the ratio of the "total" (network) signal response due to the current source $I_1$ with, $K^t_{31,+jw}=K^t_{31,+jw}.\exp.\angle+j\varphi_{31,+jw}$. Similarly, by assuming $I_1$ inactive and replaced by its internal admittance, $Y_{01,+jw}$, while the current source $I_2.\cos\delta$, is active, another signal voltage, $e^t_{32,+jw}.\cos\delta$, will appear across junction c and ground, so that, for an arbitrarily chosen direction, $\delta$, of the incident radio wave, I may define the "total" (network) signal response due to the current source $I_2.\cos\delta$ of network II, $e^t_{32,+jw}.\cos\delta$ (total system function, or, total generalized coupling) to the current source, $I_2.\cos\delta$, with, $Kt_{32,+jw}=K^t_{32,+jw}.\exp.\angle+j\varphi_{32,+jw}$.

$K^t_{31,+jw}$ and $K^t_{32,+jw}$, in other words, may be considered "amplification gains" (complex) of the total network configuration of network I, II and III with either $I_1$ or, respectively, $I_2.\cos\delta$, active therein.

If it were not for the fact that the "mutual" coupling links, $M_{12}$, $M_{21}$, are the cause for an "interaction" between networks I and II, obviously, we could then think of "individual" amplification gains, respectively, of network I and network II, counting the gains from the respective network input terminations to the common junction or coupling joint c of network III. Thus, if we had a means within the coupling structure to render ineffective the coupling effects due to the coupling links $M_{12}$, $M_{21}$, these individual amplification gains, which we define with the symbolic representation, $K_{12,+jw}$ and $K_{21,+jw}$, respectively, in opposite directions between the input terminations of network I and II, would become zero.

This fact in turn leaves only two of the total of three such "individual, generalized coupling pairs," namely, $(K_{13}, K_{31})_{+jw}$ and $(K_{23}, K_{32})_{,+jw}$ and it is seen from FIG. 12 that a possible energy transfer between the input terminations of networks I and II is now restricted to take place, respectively, from network I to network II over the series combination of coupling links, expressed by the product of $M_{23}.M_{31}$ (indicated by arrows) and from network II to network I over the series combination of coupling links (indicated by arrows), expressed by the product of, $M_{13}.M_{32}$.

Now, in order to render ineffective the interaction between the two networks I and II over said series coupling paths and, yet, preserve an energy transfer, respectively, in directions from the input terminations of network I and II to the common point of coupling (junction c) it is merely necessary to impede energy flow over the coupling links, $M_{13}$ and $M_{23}$ in directions from junction c to junction a and, respectively, b. One of the possible practical means to do this consists in providing the output terminations of networks I and II, to be sure, prior to the junctions a and b, with uni-laterally conducting circuit elements which permit the flow of energy toward the junction c, but not in the opposite directions, i.e., in directions c to a, and c to b.

Having accomplished this it is readily seen that the remaining individual, generalized couplings are, $K_{31,+jw}$ and $K_{32,+jw}$. They are the useful ones contributing to the combination of the two antenna signal responses, $e_{31,+jw}$ and $e_{32,+jw}.\cos\delta$. The question now arises: (1) under which parameter conditions in networks I and II can we expect the amplitudes $/e_{31}/_{,+jw}$ and $/e_{32}.\cos\delta/_{,+jw}$ to remain in a constant ratio to each other while the operating frequency is varied over the usual range of approximately a 2.5 to 1 ratio, and (2) under which parameter conditions in networks I and II can we expect the phases of $\exp.\angle_{+jw}\varphi_{31}=\alpha$, and $\exp.\angle_{+jw}\varphi_{32}=\beta$, to assume a constant difference $(\beta-\alpha)$, as the said operating frequency is varied over said range?

Then, the desirability for these amplitude and phase conditions should now be obvious: we strive to make the individual frequency variations of amplitudes and phases of the two signal responses, $e_{31,+jw}$ and $e_{32,+jw}.\cos\delta$, identical with respect to each other as the operating frequency is varied. This will insure the possibility of obtaining a in-phase condition of the signal responses in the maximum signal direction $\delta=0°$ direction, in which the amplitudes must be alike if the combined signal response, as a function of $\delta$, is that of a cardioid characteristic. Or, by the same token, we may get the condition of true phase oppositions in the $\delta=+180°$ direction, giving a true cancelation and the desired cardioid "minimum" signal.

It is seen that we have arrived at the establishment of the principal requirement (mm) and that of (I) referred to at the outset of this specification through purely elementary consideration. Actually, they represent mathematical limiting conditions among the parameters of three integro-differential equations set up for the dual network shown in FIG. 9A.

Thus, the parameter conditions required of conventional high frequency input networks, such as shown in FIG. 1 are complicated by the necessity of unlike antenna energy transfers betwen network I and II that must be in a reciprocal complex amplitude and, respectively, phase relationship. This calls for asymmetrical network terminations at the junctions a and b and the actual presence of the mutual coupling links, $M_{12}$ and $M_{21}$ in FIG. 12. The undesirable feature of these arrangements, however, is that the network shown in FIG. 9a can only be solved for an in-phase condition, or, an out-of-phase condition between equal signal responses in the $\delta=0°$ and $\delta=+180°$ directions for one single frequency inside a given frequency range. Theoretically, to maintain these conditions over the frequency range would require solving the said integro-differential equations for a new set of network parameters, every time the frequency is changed from one value to another. This, of course, is practically impossible. One has to be content with a in-phase solution at the mid-frequency point of the receiver range and permit deviations from the in-phase condition to either side of the frequency range for granted.

It has already been mentioned that one of the two networks I or II must contain a "balanced modulator" circuit. While the term itself implies that modulator circuits of this kind must be properly balanced to function properly, i.e., to produce pure sideband frequency signals only, without the carrier frequency signal, it should be noted that the balanced "carrier suppression" must be automatically maintained over a given frequency range.

If the carrier leaks through, however small, interference noise and thermal noise entering the antenna will modulate the carrier to the extent that the receiver will amplify the noise-modulated carrier and cause instability of the cardioid-null signal. Indications of this null will become erratic as soon as the interference signal level becomes comparable in magnitude with the signal level.

Aside from this highly undesirable phenomenon which creates unsteady, visual bearing direction indications, the mathematical analysis of FIG. 12 and the dual circuit arrangements of FIG. 9A shows, that instead of the principal requirement (mm) another more complicated phase relationship among the three phase constants, $\alpha$, $\beta$ and $\lambda$, ($\lambda$ being the phase angle of the passive collector circuit of network III) must hold, namely, (LL) $\alpha+\beta+\lambda=\pm 90°=$constant over a frequency range, so that the sum of the respective frequency variations of these phase angles must be zero, i.e., $$d(\alpha)/df+d(\beta)/df+d(\lambda)/df=0$$

for all frequencies over the frequency range.

Now, to achieve the "principal" requirement (mm), the phase constants of the individual system functions $K_{21,+jw}$, and $K_{12,+jw}$, respectively, $\alpha$ and $\beta$ of the active antenna networks I and II must have signs of opposite polarities, i.e., $+\alpha$ and $-\beta$, or $-\alpha$ and $+\beta$. Since we are primarily concerned with keeping said 90° phase difference, in the interest of a constant phase alignment, constant, we are to make the frequency variations $d(+\alpha)/df$ and $d(-\beta)/df$ alike, for, only in this way can we be assured that at every frequency of the frequency range of the tuning dial of the radio direction finder, said 90° difference, and with it, said in-phase condition is sustained.

It is also known that said frequency variations of phase angles with opposite polarities are of the same sign, i.e., for equal, say, positive increments, $\Delta f$, of the operating frequency f, we have to account for finite variations $d(+\alpha)/df$ and $d(-\beta)/df$ that are both positive.

The second part of Equation LL on the other hand shows upon substituting positive variations $+d(+\alpha)/df$ and $+d(-\beta)/df$ therein, that the frequency variation of the phase angle, $\gamma$, must be negative, i.e., equal to $-d(\gamma)/df$, whereas a resonance-tuned collector circuit would indicate the value $d(\gamma)/df$ to be equal to zero, since, $\gamma=0$ over the whole frequency range. Or, if we maintain $d(\gamma)/df$ at the zero value, a positive variation $+d(+\alpha)/df$ would have to be equal in magnitude to a negative variation $-d(-\beta)/df$. This consideration is believed at the base of the many "counter-measures" that are proposed in the active antenna networks I and II in the form of "phase corrective networks." But such is not possible except at one operating frequency only unless the frequency characteristics are "shaped" by additional mechanical "ganging methods" between the active networks. It is seen that the removal of the condition of constraint (ii) by nullifying the mutual coupling links $M_{12}$, $M_{21}$ (FIG. 12) is obviously a much more efficient and direct approach to the problem of meeting the "principal requirement" of phase alignment (mm). We are thereby giving the system an additional degree of freedom by which a variation of $d(+\alpha)/df$ and $d(-\beta)/df$ may take place independently from the variation $d(\gamma)/df$. The latter may therefore be kept constant.

Summarized, we may briefly state the conditions necessary to fill the functional requirement (I) and principal requirement (mm), respectively, among the three individual generalized coupling pairs as defined above: (see FIG. 12).

(1)

$K_{21,+jw}=K_{12,+wj}=0$, consistent with $M_{21}=M_{12}=0$. $K_{31,+jw}=K_{32,+jw}$, consistent with, $M_{31}=M_{32}$, and, $K_{13,+jw}=K_{23,+jw}$ . . . , consistent with provision of uni-lateral circuit elements that are identical and form, in effect, the output terminations of network I and II, In other words, making $M_{31}=M_{32}$ and $M_{12}=M_{21}=0$, and, since these circuit branches of the coupling structure are included in the general concept of our individual system functions between, respectively, the points of coupling and the current sources, we have now proven the second stipulation in the functional requirement (I), namely, that $K_{31,+jw}=K_{32,+jw}$ and, in the opposite directions, $K_{13,+jw}=K_{23,+jw}$.

Particular stress is laid upon the importance and far reaching significance of the extremely broad character of the above symbolized statement, because it embraces any kind of high frequency input system that we can possibly think of at the moment. The statement conveys the condition when, in direction of maximum signal pick-up of the directional antenna, the antenna energy distribution in the system becomes even, in contrast with the claim made in the U.S. Patent 2,142,133, whereby the antenna energy distribution in the system was defined un-even so long as asymmetrical output terminations ($Y_a$,$Y_b$) were resorted to in the active antenna networks I and II.

Under conditions of coupling, i.e., with the mutual circuit branches $M_{12}$, $M_{13}$ and $M_{23}$ intact, the FIG. 12 shows clearly that the total current $I_3$ flowing through the input admittance $(Z_{33})^{-1}=Y_{33}$ is equal to $i_{31}$ plus $i_{32}$, each of the latter of which is made up of two components, namely, $i_{31}=i_{11}+i_{21}$ and, $i_{32}=i_{12}+i_{22}$.

$$\frac{48}{D}$$

Simple deductions may be derived for asymmetrical terminations $Y_a$ and $Y_b$: If, for a given potential $e_{1,0}$ at output node a the admittance $Y_a$ is small, a correspondingly larger current component $i_{21}$ and current component $i_{32}$ must result, while for a given potential $e_{2,0}$ at the output node b, respectively, equal to $e_{1,0}$ a large admittance $Y_b$ would entail the flow of smaller currents $i_{12}$ and $i_{32}$. There will be a difference between the currents, i.e., $(i_{12}-i_{21})$ flowing around the loop formed with nodes a, b and c, respectively, in the indicated direction of rotation. This is a so called "gyrator" action which manifests itself in the form of an energy sink (circulating current). The magnitude of this energy sink, obviously, can be controlled by the magnitude of the admittance $M_{12}=M_{21}$ and if we could manage to make it equal to zero, no such circulating current could form at all.

If we for the moment assume, that the current components $i_{31}$ and $i_{32}$ are, at a specified operating frequency f, in phase with each other, we may then compute the potential drops from the node c, respectively nodes a and b. Obviously these are largely governed by the output admittances $Y_a$ and $Y_b$ whose absolute values and phase angles, as in the case of conventional high frequency input systems, are, respectively, completely different from each other. For this reason the potentials developed across the nodes a and, respectively, b to the datum junction will differ with respect to both, phase and amplitude despite the fact that we have assumed currents $i_{31}$ and $i_{32}$ as having, respectively, equal phases and amplitudes. In other words we have obtained a brute force phase alignment by the sole fact, that the difference between the phase constants, $\alpha$ and $\beta$, of the two networks I and II can no longer be 90°; if they were, such would not agree with the unalterable fact of a constant 90° phase difference between our current sources $I_1$ and $I_2$ (sense antenna and directional antenna). At another operating frequency this in-phase condition between $i_{31}$ and $i_{32}$ will be immediately upset, of course. We can no longer speak of a "sustained phase alignment," since with the foregoing required initial condition, $(\beta-\alpha)\neq 90°\neq$constant, we must conclude that the frequency variations $d(+\beta)/df$ and $d(-\alpha)/df$ are not identical. This means a "divergence" from a desired parallelism between the current components $i_{31}$ and $i_{32}$, as the operating frequency is changed over the tuning range of the collector network III.

The fact that we have mechanically and electrically ganged resonance tuned high frequency circuits in the antenna networks I and II, respectively, with the resonance-tuned collector network III does not alter the above undesirable source for frequency errors to develop in the least. Then, it should be kept in mind that these circuits, in so far as their contribution to a finite phase angle component, respectively, of the whole phase constants, $\alpha$ and $\beta$, is concerned do not in any way enter into the consideration of the frequency variations $d(+\beta)/df$ and $d(-\alpha)/df$ of the phase constants.

In asymmetrical network terminations the operation of the circuits is, in so far as the directional determinations in the $\delta=+90°$ and $\delta=+270°$ directions are concerned, dependent only upon the geometrical configuration of the directional antenna. Hence the operation as such is not affected by the above undesirable features, directly so. But indirectly, it will be noted that while the current source $I_2$ of the loop antenna may be assumed (+), rendering, say, a (+) potential $e_{2,a}$ at the node a, respectively, in the $\delta=0°$ direction, and the current source $I_1$ of the sense antenna we assume likewise (+), the said potential $e_{2,a}$ will become equal but negative (−) in polarity in the $\delta=+180°$ direction. Instead of a current $(i_{12}-i_{21})$ flowing around the loop formed with nodes a, b and c, respectively, in the indicated sense of rotation in FIG. 12, we have now a circulating current $(i_{12}+i_{21})$ flowing in the opposite sense of rotation thereto. This means that the periodical reversal of a receiving characteristic which is not that of a constant cardioid to begin with, becomes untrue. The turn-indicator sensitivity to either side of the symmetry axis of the directional antenna becomes, in other words, asymmetrical at greatly reduced absolute values thereof. This may affect the proper functioning of the "loop follow-up mechanism," such as is used in the case of the automatic airborne radio direction finders with a 0° to 360° bearing indication direction to above. (ADF's.)

Having now fully explained the physical significance of the individual system functions, or, generalized, individual coupling pairs, we may use simple diagrams in block form, to briefly summarize the characteristic features of the operation of conventional high frequency input system. This is done in FIG. 5A. We imagine said networks placed at the corners of a triangle which may be thought of being a "current triangle" or a "generalized" triangular coupling system, both, depending on the view point which is taken. Thus, the sides of the triangle may be considered as generalized coupling paths, symbolized by the individual system functions, $(G_{21},K_{12})_{+jw}$, $(K_{31},K_{13})_{+jw}$, and $(K_{32},K_{23})_{+jw}$, respectively, between the sense antenna network 1, the directional antenna network 2, and the receiver network 3. Considering at first only network 1 "active" with the others "passive," it is easy to visualize a "direct" current flow $i_{11}$ made possible in any manner whatever from network 1 into network 3 over the generalized, individual coupling $K_{31,+jw}$, and, another, "indirect" current flow made possible from network 1, over network 2 into network 3, also in any way whatsover, respectively, by way of the two individual system functions, $K_{32,+jw}$ and $K_{21,+jw}$ in series, as symbolized by the product, $(K_{32},K_{21})_{+jw}$. This current we shall designate with $i_{21}$ (because it flows in direction from network 1 to network 2) so that in the receiver network 3 we have now a resultant current $i_{31}=i_{11}+i_{21}$, both, derived from the voltage source in the sense antenna network 1. It is hardly conceivable that the said two current components are either of equal magnitude or of equal phase. The resultant current $i_{31}$, therefore, has a different phase from either of its components $i_{11}$ and $i_{21}$.

Assuming now the directional antenna network 2 "active" and networks 1 and 3 "passive," we can again visualize a "direct" current flow $i_{22}$ made possible in any manner whatsoever from network 2 into network 3 over the generalized, individual coupling, $K_{32,+jw}$, and, another "indirect" current flow $i_{12}$ made possible from network 2, over network 1 into network 3 in any arbitrary manner (without mentioning specific coupling paths from certain portions of network 2 to certain portions of network 3) so that in the receiver network 3 we have a second resultant current $i_{22}=i_{12}+i_{22}$, both components derived from the voltage source in the directional antenna network 2. Also in this case it is hardly conceivable that the said two current components are either of the same magnitude or the same phase. The resultant current, therefore, has a different phase from that of either of its components $i_{12}$ and $i_{22}$.

Under these arbitrary conditions, however, we can imagine a "brute force" in-phase condition between said "resultant" current components $i_{31}$ and $i_{32}$. Because of the two current triangles of which these form the closing sides, obviously, the "direct" current components $i_{11}$ and $i_{22}$ can no longer be assumed to be in an in-phase condition, if such is stipulated for the resultant currents $i_{31}$ and $i_{32}$ in the receiver network 3.

Generally then, we have to account for four current components. In high frequency input systems, however, where the one current component, say, $i_{21}$ from network 1 into network 2 is suppressed by virtue of, say, a unilateral element, such as a vacuum tube at the output of network 2, while no such suppression takes place with respect to the current flow $i_{12}$ in the opposite direction, there are, principally only three current components present in the collector network 3. This represents the much discussed "asymmetrical coupling condition" common to all high frequency input systems of the Dieckmann-Hell system, including the most up-to-date systems of currently used automatic airborne radio direction finders. The resultant current $i_{23}$ is, therefore, equal to $\pm i_{12}\pm i_{22}$ depending on whether the direction of the incident radio wave is to the one or the other side of the directional antenna's symmetry axis, respectively, relative to the current $i_{31}=i_{11}$ whose polarity remains unaltered, of course, for any and all directions of the incident radio wave. Thus, to one side of said symmetry axis, the total current $I_3$ is equal to: $I_3=i_{11}+(i_{12}+i_{22})$, and, on the other side of said symmetry axis it will be: $I_3=i_{11}-(i_{12}+i_{22})$. The phase of $(i_{12}+i_{22})$ being different from $i_{11}$ it is seen that in no event is it possible to effect a cardoid minimum for which the difference, $i_{11}-(i_{12}+i_{22})$ would have to be zero.

Figure 5B:
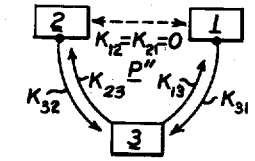
FIG. 5B is a generalized, mathematically equivalent, circuit diagram showing a coupling system in accordance with the invention which uses the principle of "pure parallel feed systems"
Figure 5A:
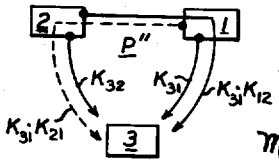
FIG. 5A is a generalized, mathematically equivalent, circuit diagram showing certain coupling paths among three mutually coupled networks such as found in the conventional direction finder circuits of the cardioid type.

To alleviate this very undesirable condition common to all such asymmetrically terminated high frequency input systems we may now show a generalized simple mathematical network, such as shown in FIG. 5B in accordance with this invention.

Herein the common point of coupling resides again in the collector network 3. However, both current components $i_{12}$ and $i_{21}$ are prevented from forming, thus leaving only the "direct" flowing current components, $i_{11}$ and $i_{22}$ in network 3. These flow, respectively, in direction from networks 1 and 2 into network 3, and the respective energy transfers are symbolized by the individual system functions, $K_{31,+jw}$ and $K_{32,+jw}$. Referred to the common point of coupling residing in network 3 this is, therefore, a parallel-input network type belonging to classification (A) of single systems, which classification may be extended to embrace inductively coupled circuits, provided, each circuit system 1, 2 and 3 has a common datum junction (common ground connection). There exist several practical circuit solutions bringing about either the elimination of $(K_{21},K_{12})_{+jw}$ between networks 1 and 2, or rendering this generalized coupling pair ineffective with the collaboration of the other two generalized, individual couplings $K_{31,+jw}$ and $K_{32,+jw}$, respectively, ahead of the actual point of coupling in network 3.

A line of distinction, however, must nevertheless be drawn between inductively and direct coupled systems in regard to keeping the "residual" coupling, i.e., after removal of the undesirable one $(K_{12},K_{21})$, below a certain "critical value." Generally, FIG. 5B shows the residual coupling between networks 1 and 2 to consist of the two series couplings, $K_{23},K_{31}$, respectively, in direction from network 1, over network 3, into network 2, and, $K_{13},K_{32}$, in direction from network 2, over network 3, into network 1.

We can visualize the blocks 1, 2 and 3, in a highly generalized sense, as the high potential nodes of the three networks 1, 2 and 3 to a common datum junction (ground, not shown). We can further assume (see FIG. 12) the individual system functions $K_{31,+jw}$ and $K_{32+jw}$ to contain the individual branches $M_{31}$ and $M_{32}$ as a result of "inverted mutual inductances $m_{31}$ and $m_{32}$" with the addition, respectively, of capacitive elements, $C_{31}$ and $C_{32}$ in parallel with the inverted mutual inductances $m_{31}$ and $m_{32}$.

Thus, with further reference to FIG. 5B, any change of the current source, say, $I_1$ in network 1 will develop a change in potential across the node 3 and ground because of the impedance $Z_{33}$ interposed between the two nodes. This change in potential, in turn, will adversely affect the current source $I_2$ in network 2. Similar considerations hold for changes of the current source, say, $I_2$ in network 2 in so far as they affect the current source $I_1$. Because of this "residual coupling effect" between networks 1 and 2 due to the impedance $Z_{33}$, common to both networks at the point of coupling, a true addition of the effects of the current sources is still limited in its accuracy. Fortunately, in the case of inductively coupled networks, however, the mutual inductance between the input winding and the output windings, respectively, of the network 3, as related to networks 1 and 2 may be made small enough to fall below the value of what is called the critical coupling coefficients, say, $k_{31}$ and $k_{32}$. The "critical coupling coefficients" are defined by the expressions, $k^2_{13}=K_{13},K_{32}/Q_{11},Q_{33}$, and $k^2_{23}=K_{23},K_{32}/Q_{22},Q_{33}$, in which $K_{13},K_{31}$ and $K_{23},K_{32}$ are the absolute amplitude functions of our generalized individual coupling pairs, $(K_{13},K_{31})_{+jw}$ and $(K_{23},K_{32})_{+jw}$ and $Q_{11}$, $Q_{33}$ are the "Q" factors, respectively, of the equivalent two-terminal networks of the antennae networks 1 and 2. Thus, in meeting with the restriction that:

(oo) $k^2_{13}+k^2_{23}\leqq 1$, as a result of removing the effect of $k_{12}$ by which fact the condition of constraint (ii) is no longer existing, and making, $K_{31},K_{13}$, and, $K_{32},K_{23}$, respectively, smaller than 1 we are able to keep the "residual mutual coupling" between networks 1 and 2 below the point where it might adversely affect the phase and amplitude of either current (or voltage) source.

In the case of "direct" coupled networks there are, as we shall see presently, other practical means to keep the residual coupling referred to at an absolute minimum. This may be done, both, before, and after the common point of coupling.

In conformity with the functional requirement (I) and in accordance with this invention, the following specific "identity relations" determining the performance of these systems, symbolically represented by FIG. 5B, in accordance with the specified "principal" requirement (mm) may be written:

(pp) (a) $/K_{21}/_{+jw}=/K_{12}/_{+jw}=0$, and,
(b) $/K_{31}/_{+jw}=/K_{32}/_{+jw}$, in particular, for inductively coupled circuits,
(c) $k^2_{13}+k^2_{23}\leqq 1$, with: $k_{31,+jw}=k_{32,+jw}$.

Figure 5C:
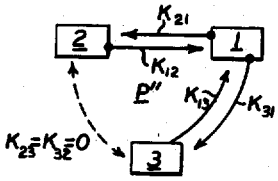
FIG. 5C is a generalized, mathematically equivalent, circuit diagram showing a coupling system in accordance with the invention which uses the principle of "pure series feed systems"

A sub-classification which we shall designate as "Series Feed Systems" in the case of inductively coupled circuits results from the above classification (A) of single systems, if, as in one of the specific embodiments of this invention, wherein a special variably adjustable three winding H.F. mixing transformer is employed for the purpose of rendering the circuit branch $M_{12}=M_{21}$ in FIG. 12 non-existent, the actual point of coupling is made to reside, instead of in network 3, in the output termination of either antenna network 1 or 2. The mathematical network is symbolized by FIG. 5C. The case in which the output termination of network 2 forms the common point of coupling is considered. FIG. 5C is best understood with reference to a comparison with FIG. 12 under special conditions in the coupling structure, i.e., with branch circuit $M_{23}=M_{32}$ between the two junction pairs, b—j and c—j considered "removed." Let us assume that the said removal was accomplished in a similar manner as in the case of said specific embodiment of this invention where the mutual branch circuit $M_{12}=M_{21}$ was removed by means of said variably adjustable transformer.

The actual point of coupling is node a in FIG. 12. The current source $I_1$ will cause a current $j_{11}$ to flow through the output admittance $Y_a$, respectively, in direction from node a to the datum junction j across which, in turn, a potential $e_{o1}$ will be developed. The current source $I_2$ will cause a current $i_{22}$ to flow through the output termination $Y_b$ from node b to the common node, or, datum junction j, across which, in turn, the potential $e_{o2}$ is developed. Between the junction pairs b—j and a—j there will be a voltage drop $(e_{o2}-e_{o1})$ causing a current $i_{12}$ through the mutual branch $M_{12}$ in direction from b to a. Resultant currents, $i_{31}=i_{11}-i_{12}$ will flow, say, in the $\delta=0°$ direction, and $i_{31}=i_{11}+i_{12}$, respectively, in the $\delta=+180°$ direction of the incident radio wave, from node a (the common point of coupling) to node c of the collector network III. Obviously, for the obtainment of a cardioid the absolute values, $|i_{11}|$ and $|i_{12}|$ in said maximum signal pick-up directions of the directional antenna must be equal, and, the phase difference between the node potentials $e_{o2}$, $e_{o1}$, must be made equal to a constant, frequency independent value of 90°, provided the antenna networks I and II are designed symmetrically and, if the currents $i_{11}$ and $i_{12}$ are to remain in an in-phase condition over a frequency range. The current $i_{32}$ between node b and node c is no longer possible because the branch $M_{23}=M_{32}$ is rendered ineffective. Thus, as in the case of FIG. 5B, only two current components are present at the two nodes a and e of the collector network III. Equal absolute values $|i_{11}|$ and $|i_{12}|$ may be had by adjusting the amplification factors of networks I and II relative to each other, while the said required phase shift of 90° between the potentials $e_{o2}$ and $E_{o1}$ may be achieved by adequate terminations $Y_a$ and $Y_b$.

Referring now to both, FIG. 12 and FIG. 5C, a comparison between the just now specified coupling conditions in FIG. 12 and those in FIG. 5C shows that they are, considered from a more general view point, identical. The directional antenna energy transfer from network II into network III may be symbolized, as shown in FIG. 5C by the series path indicated thereon with $$(K_{31},K_{12})_{+jw}$$

respectively, by comparison with the non-directional antenna energy transfer from network I into network III symbolized by the individual system function, $K_{31,+jw}$. FIG. 5C, it should be emphasized, serves the purpose of illustrating a more general concept of the energy flow distribution than would be possible with the aid of FIG. 12.

It will be seen more clearly later in this specification how the elimination of the generalized, individual coupling pair $(K_{23},K_{32})_{+jw}$ is rendered ineffective. Since the admittance termination $Y_a$ now represents the "common coupling," or, "residual" coupling between networks I and II defined by the ratios, respectively, $Z_a/Z_a+Z_{T,1})$, and, $Z_a/(Z_a+Z_{T,2})$ in which $Z_a=(Y_a)^{-1}$, and $Z_{T,1}$, $Z_{T,2}$ are the "internal input impedances" of networks I and II, respectively, as seen from the node a into said networks, a coupling effect of this kind may be rendered small, for instance, by making the branch admittance $M_{12}$ (see FIG. 12) large by comparison with the stray capacitive admittance $C_{12}$ between the networks I and II.

In conformity with the functional requirement (I), and, in accordance with this invention, the following "specific identity relations" determining the performance of these systems in accordance with the "principle" requirement (mm) may be symbolically expressed:

(gg)
(a) $/K_{12}/_{+jw}=/K_{21}/_{+jw}$, with (b) $/K_{23}/_{+jw}=/K_{32}/_{+jw}=0$ and the particular provision for inductively coupled networks of this kind, (c) $k_{32,+jw}=k_{32,+jw}=0$, and, (d) $k^2_{12}+k^2_{13}=1$. Condition (d) is the result of a substitution of (c) into the condition of constraint (ii).

Figure 3:
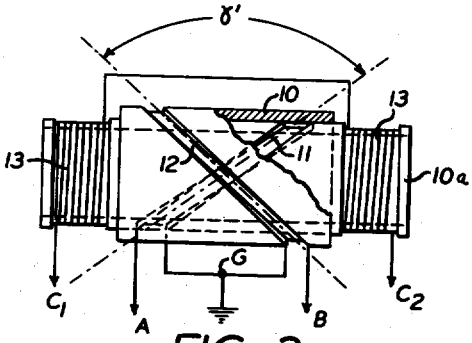
FIG. 3 is an elevational view, partly broken away, showing a three winding coupling transformer suitable for use in practicing the invention.

In FIG. 3 is shown a variably adjustable H.F. three winding mixing transformer which enables the elimination of any of the above referred to generalized, individual coupling pairs.

Wound upon a coil former 10, which is hollow in order to receive another coil former 10a, which is rotatable inside the coil former 10, is a crossed coil 12 and a one half of another coil 13, while a second crossed coil 11 and the other half 13, of the other coil are wound on the rotatable coil former 10a. In the relative position of the coil formers 10 and 10a shown in FIG. 3 the angular displacement between the two crossed coils is, ', making an angle which is greater than 90°, but which can be made less than 90° by merely rotating the coil former 10a inside the coil former 10.

This will be more clearly understood when visualizing the variations of the included angle between the "normal" directions to the plane surfaces, or cross-sectional areas of the two crossed coils 11 and 12, so that, in their relative positions as shown in FIG. 3, the corresponding fluxes of the crossed coils interlink with each other. The flux of crossed coil 12, with an assumed direction and magnitude, will enter crossed coil 11 from one side, while, when turning coil former 10a relative to the other by a sufficient amount of angular rotation, it will enter from the other side.

We may follow the process more closely by visualizing, instead of the angle, $\gamma'$, between areas of the cross section cut out in the cylindrical coil form 10 by the crossed coils 11 and 12 (elliptical configurations), the included angle (not shown) between the "normal" direction of said cross-sectional areas, which, unlike the angle, $\gamma'$, in the position of the two crossed coils 11 and 12 as shown in FIG. 3, is smaller than 90 degrees. Said normals are indicative of the directions of the electromagnetic fluxes produced by the currents flowing in said crossed coils, so that the included angle, $\gamma''$, (not shown) between the said normals is a direct measure of the amount of the "interlinkage" of the said fluxes.

Imagining for the moment the "normal" to the area of crossed coil 12 held stationary, and rotating coil former 10a in one direction or another, the "normal" to the area of crossed coil 11 will describe a conical surface with its apex located at the point of intersection of the central axis of coil former 10 with said "normal direction" as a rotating element. For a given angular displacement of coil former 10a, equal to, $\Delta\epsilon$, a plane surface comprising the two normals in the new position appears, now not only twisted but tilted as well, while the included angle $\gamma''$, between the normals has increased, say, from a value which was smaller than 90 degrees. In fact, depending upon the magnitude of the angle, $\gamma''$, in the position of the cross-sectional areas as shown, quite a considerable angular rotation, $\Delta\epsilon'$, is necessary before the included angle assumes a value of 90 degrees, and, quite an additional angular displacement, $\Delta\epsilon''$, is necessary to make the included angle, $\gamma'$, substantially greater than 90 degrees. The mechanical arrangements acts very much in the manner of a "micrometer adjustment" of a variation of the electrical coupling effects between the crossed coils 11 and 12.

The outer ends of crossed coils 11 and 12 are connected to terminals A and B, respectively, while the other, inner ends are joined at the terminal G, which is grounded directly as shown in FIG. 3, or which may be grounded over a blocking condenser (not shown). The outer ends of the two coil halves 13 wound, respectively, on coil formers 10 and 10a are connected together as shown, or may lead to a common terminal (not shown).

It will also be noted that the said angular rotation does not in any way alter the direction or the magnitude of the electromagnetic flux interlinking crossed coil 11 with one of the winding halves 13, or crossed 12 with the other winding half 13 because of the inherent symmetrical disposition of the crossed coils 11 and 12 relative to the winding halves 13.

The "equivalent total" reactance, which, at some arbitrary operating frequency of the currents flowing through the coil system, might be found to exist, by, for instance, measuring the R.F. potential between terminals A and B when feeding with a voltage source across terminals B and G, with a short circuit across terminals A and G and terminals $C_1$, $C_2$ left open-circuited, may be thought of consisting of four contributing factors, namely:

(1) the mutual inductance between crossed coils 11 and 12 (comparable, for instance, with the mutual inductance of two primary transformer coils, respectively, connected to the input terminal pairs of an assumed six-terminal network (coupling structure) P'' in FIG. 1);

(2) the mutual capacitance between the two crossed coils, (distributed capacitances);

(3) the mutual capacitances between each of the two crossed coils 11 and 12 and, respectively, the two coil halves 13, (distributed capacitances); and, (4) the "equivalent lumped" capacitances, appearing individually and in parallel to the above capacitances (2) and (3), which are due to the "amplified chassis effect" as it appears between the two crossed coils.

For any arbitrary set of conditions (1) to (4) above, there will be found a natural period or frequency of oscillation at which the above inductive and capacitive reactances will neutralise each other, as, when, for instance the negative term in definition (nn) becomes equal to the positive term, while, at the same time, secondary resistances reflected into the parallel mutual circuit inductance and capacitance combination will limit the electrostatic charging (circulating) current flowing therein. This appears somewhat of a nebulous statement because one is accustomed to visualize a "closed circuit" when we speak of a resonance condition. Actually, when the phenomenon, better termed "anti-resonance" than "neutralization" is considered as such, it would be observed at the exciting end-terminals of the voltage source between B and G, that energy is being "absorbed" due to the anti-resonance phenomena to the extent of which reflected secondary resistances make their appearance (these resistances are given in definition (nn) represented by the conductance $G_{ij}$). The natural oscillation may therefore be "critically damped," resulting in a "broadened" anti-resonance effect. It should be realized that at a given operating frequency at which the anti-resonance phenomenon occurs, the said reflected secondary resistances may be small to the vanishing point, but, on the other hand, the situation changes rapidly as soon as we connect a "load impedance" across the heretofore open-circuited terminals $C_1$ and $C_2$, such as a variable tuning condenser to tune the winding halves 13 to resonance. Clearly, under arbitrary conditions (1) to (4) above, the frequency range, as determined by the magnitude of the sum total of inductance of the two winding halves 13 and the difference between the minimum and maximum capacity settings of the said variable tuning condenser (being, for instance, that of the collector network III in FIG. 12, (not shown)), when considered isolated, cannot be the same as in the case when the above numerated reactances (1) to (4) enter into play. In all probability, in other words, the said frequency range will be "shifted" toward a region of lower frequencies.

But should we design a coil structure as shown in FIG. 3, such that said reactance components "neutralize" each other, say, by definition (nn) at the mid-frequency point of the frequency range in question, and we are able to maintain said state of neutralization by "following up" with the essential adjustment between the two crossed coils 11 and 12 in correspondance with the variable tuning condenser settings over an entire tuning range, then the frequency range is "shifted back" to its former relative position along the frequency scale, as though no coupling [coupling] with a marked "detuning influence" were present.

It has been found that the extent of the required relative angular rotation between the coil formers 10 and 10a during said follow-up procedure, as the frequency of the tuning of the collector input network III is changed, depends on the initial magnitudes of capacitive reactances involved, and that with careful design the said initial reactances can be reduced to values which render the required "follow-up" motion between the two coil formers so small that, in fact, very good results of an average consistent "neutralization" over the whole frequency range may be had, by merely locking the best adjustment position between the coil formers in place, preferably, at the mid-frequency point of the "unaltered" frequency range of the collector input circuit III. In this case the coupling structure is said to have a "zero phase shift characteristic."

If we denote the coupling pair between terminals A and B with $k_{12}=k_{21}$, the one between the terminals A and, respectively, terminals $C_1$, $C_2$ of the series connected winding 13, with $k_{23}=k_{32}$, and the one between the terminal B and, respectively, terminals, $C_1$, $C_2$ of the series connected winding 13 with $k_{13}=k_{31}$, we may, under the above specified conditions of a "sustained neutralization" or "anti-resonance condition" over the whole of the frequency range, express this fact by saying that the generalized individual coupling pair $(K_{21},K_{12})_{+jw}=0$ has been rendered ineffective by virtue of the condition, $k_{12}=k_{21}=0$. Moreover, the ordinary coupling coefficient pair, $k_{12}=k_{21}$, has been made to disappear "independently" from the coupling coefficient pairs, $k_{32}=k_{23}$ and $k_{13}=k_{31}$. This is a positive criterion for having dispensed with the condition of constraint (ii). Careful attention should be given to the design, of course, of the electrical parameters and physical arrangement of the coupling transformer, in order to make the "response curve" of the voltage measured, say, between the terminals A and G, while the terminals B and G are fed with a high frequency voltage source, "run flat" with the frequency variation of said applied voltage source, having but negligible amplitudes over a given frequency range, respectively, at the most suitable setting between crossed coils 11 and 12 (locked in position during the measurement). Having thus obtained a satisfactory response curve with the "load circuit" of collector circuit III "open," the latter will, upon being closed, track precisely with the remaining high frequency resonance-tuned circuits in the active networks I and II, provided the coupling values $k_{31}$ and $k_{32}$ are equal, respectively, with a magnitude which is equal, or, below to the "critical coupling value." The symmetrical construction of the transformer will automatically bring about this required condition.

Figure 4:
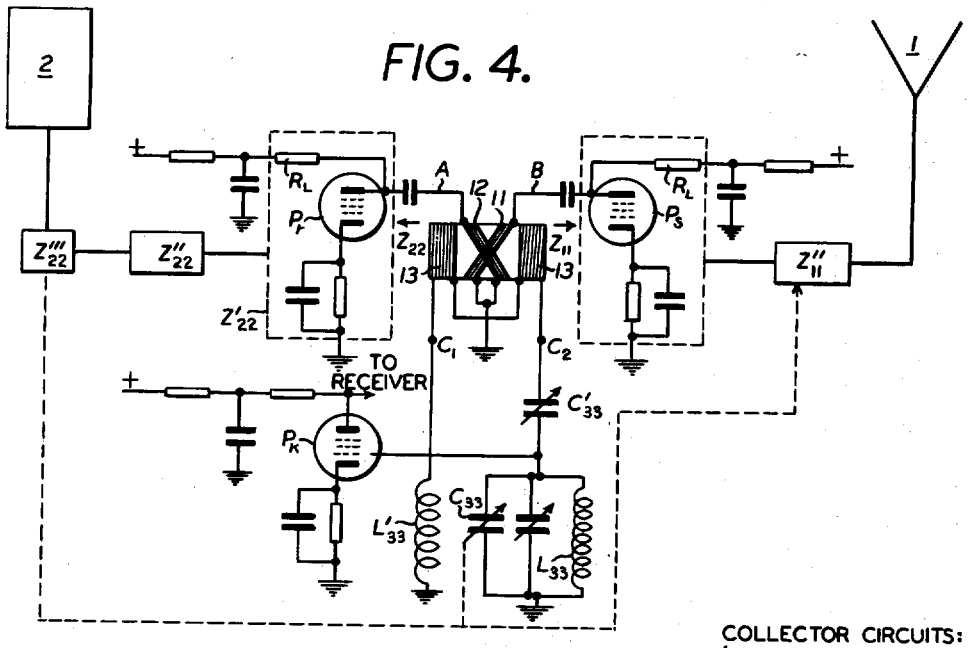
FIG. 4 is a schematic circuit diagram of a radio direction finder using the coupling transformer shown in FIG. 3.
Figures 8, 10:
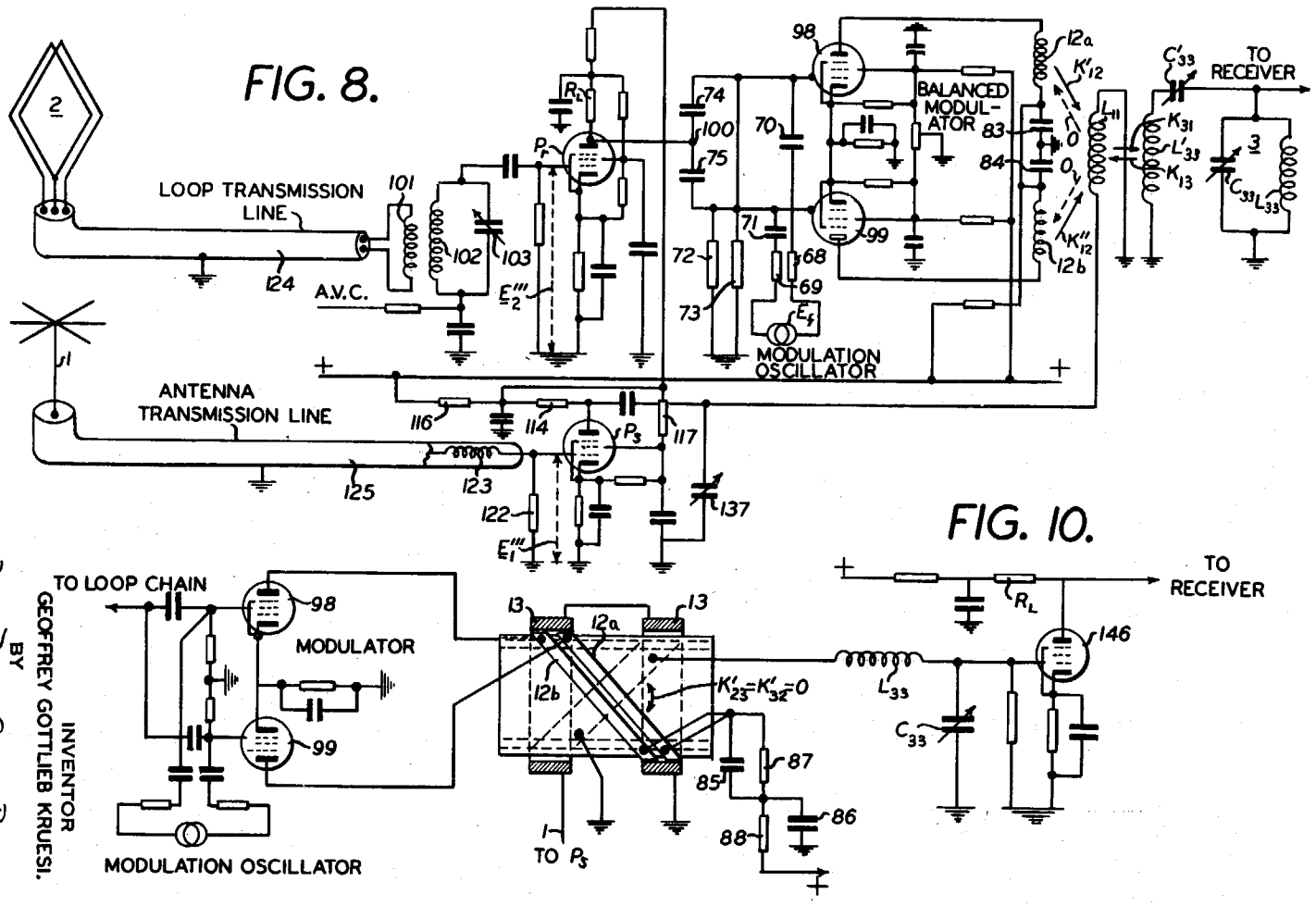
FIG. 8 shows a high frequency input circuit arrangement of the "series feed" type for a radio direction finder of the visual indicating type.
FIG. 10 shows a circuit arrangement including a balanced modulator connected to a modified form of the transformer shown in FIG. 3.

FIG. 4 shows the coupling transformer of FIG. 3 incorporated in a direction finder comprising a loop antenna 2 and a non-directional sense antenna 1. The coupling system is of the type represented by FIG. 5b. The sense antenna 1 is connected through an output stage $Z''_{11}$ to the control grid of a pentode amplifier $P_s$, the output of which is fed to the coil 11 of the transformer. The loop antenna 2, which may consist of only a few turns, is connected through several input stages $Z'''_{22}$ and $Z''_{22}$ to the control grid of a pentode amplifier $P_r$, the output of which is coupled to the coil 12 of the transformer. One end of each of coils 11 and 12 is connected to ground. The coupling circuit $Z'''_{22}$ for the loop antenna 2 preferably includes a transmission line as indicated in FIG. 8. Because the loop antenna inductance is small compared to the capacity of the transmission line in parallel thereto, the antenna input circuits can be readily adjusted so that the phases of the potentials applied to the control grids of pentodes $P_r$ and $P_s$ are the same. The terminals $C_1$ and $C_2$ of coil 13 are connected over a large inductance $L'_{33}$ and a small trimmer condenser $C'_{33}$, in series thereto, to the collector circuit ($L_{33}$, $C_{33}$). Thus the coupling circuit ($L'_{33}$, $C'_{33}$) may be tuned to resonance at some intermediate point of the frequency band in use while the collector circuit ($L_{33}$, $C_{33}$) is kept continuously at resonance as the incoming signal frequency is varied. Due to the very high parallel impedance ($L_{33}$) $Q_{33}$, the resonance curve of the coupling circuit ($L'_{33}$ $C'_{33}$) is exceedingly broad and the resulting small current amplitude flowing therein reacts only feebly with the currents flowing in the remaining coils of the coupling transformer. The voltage across the collector circuit $C_{33}$ $L_{33}$ is impressed on the control of pentode tube $P_k$, the output of which is fed to the receiver. Coils 11 and 12 are adjusted relative to each other so that there is no coupling between the points A and B. The tuning of the various tuning condensers is, of course, ganged.

Figure 6:
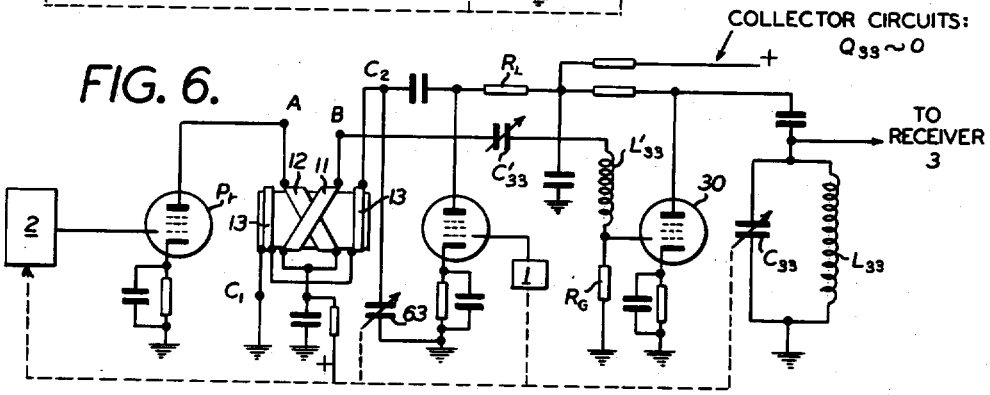
FIG. 6 is a schematic circuit diagram of a radio direction finder using the coupling transformer of FIG. 3, showing a modified form of the invention.

FIG. 6 shows still another form of the invention of the type represented in FIG. 5C. Herein one of the cross coils 12 is connected to the loop antenna circuit 2, the non-directional antenna 1 being connected to the two split windings 13—13. The connections from the antennas to the transformer are made through the pentode tubes $P_r$ and $P_s$. The output of one of the amplifier stages, for example $P_s$, is tuned to resonance by a condenser 63. The terminal B of the transformer is connected through a variable condenser $C'_{33}$ and an inductor $L'_{33}$ to the control grid of a pentode tube 30. The output circuit of pentode tube 30 includes a resonant circuit consisting of a condenser $C_{33}$ and inductance $L_{33}$. A receiver 3 is connected across the resonant circuit. Anode potential is supplied to the loop antenna output stage $P_r$ through the cross-coil 12, a suitable blocking capacitor being provided for the purpose of maintaining the common junction point of the two cross-coils 11 and 12 effectively at ground potential. The circuit $C_{33}$, $L_{33}$ is tuned to resonance. The cross-coils 11 and 12 are adjusted so as to neutralize the capacitive reactance 28 therebetween. Gang tuning may be provided as is conventional.

Figure 7:
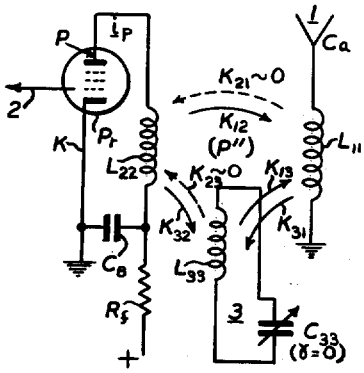
FIG. 7 shows a typical high frequency mixing circuit arrangement commonly used in radio direction finders of the conventional cardioid type.

FIG. 7 shows an example of the H.F. mixing circuits presently in use in conventional radio direction finders. For reasons of simplicity the usual chain of coupling stages has been omitted. FIG. 7, in other words, represents schematically only one half of the usual balanced modulator circuit used in the output stage of the loop antenna network. Therefore, with reference to FIG. 7, $P_r$ is a vacuum tube, usually consisting of a triode, but a pentode may be used to advantage. A three winding H.F. mixing transformer comprises three coupling coils, $L_{11}$, $L_{22}$ and $L_{33}$, wound upon an iron core (not shown). In following the circuit parameters around the closed plate circuit of tube $P_r$, there is encountered the plate resistance $r_P$ between cathode K and plate electrode P, the coupling coil $L_{22}$ with the reflected impedances of the receiver and sense antenna network terminations and the blocking condenser $C_B$. A D.C. source, marked (+) furnishes the plate supply for $P_r$ through the low potential end of coil $L_{22}$, being properly filtered by the resistor-capacitance combination of $R_f$ and $C_B$, to ground. Since no effort is made to eliminate the coupling coefficient $+K_{32}$, respectively, in direction from coil $L_{22}$ to coil $L_{33}$, a current component, $i_{22}$ from the loop network flows directly into collector circuit 3, which fact makes the ratio, $+K_{32}.K_{21}/+K_{31}$ a finite quantity. For this reason, the required phase condition (mm) does not remain constant over a frequency range.

FIG. 8 shows another circuit according to the invention wherein a sense antenna 1 is connected over a transmission line 125 and a series inductance 123 to a grid resistor 122 and thus impresses received signals on the control grid of the pentode amplifier $P_s$. Suitable potentials are applied to the screen grid through the resistor 117 and to the anode over the resistors 114 and 116. The loop antenna 2 is connected by a transmission line 124 to primary coil 101, which is coupled to secondary coil 102. Coil 102 and condenser 103 are tuned to resonance with the incoming signal. The potential across the resonant circuit is applied to the control grid of a pentode amplifier $P_r$. The output of the pentode amplifier is connected to a point 100 forming a junction between condensers 74 and 75. Condensers 74 and 75 are connected to the control grids of a pair of pentode tubes 98 and 99. The control grids of these pentode tubes are also fed by a modulation oscillator $E_f$ through a pair of resistors 68 and 69 and a pair of blocking condensers 70 and 71. The output of the modulation oscillator $E_f$ is impressed across a pair of grid leads 72 and 73 in the input circuit of pentode tubes 98, 99. The latter, in connection with the modulator-oscillator $E_f$, and the coil assembly consisting of coils 12a, 12b, $L_{11}$ and $L'_{33}$ constitute a balanced modulator circuit in which the generalized coupling pairs $(-K_{23}, +K_{32})_a$ and $(-K_{23}, +K_{32})_b$, respectively, between coil $L'_{33}$ and the coils 12a and 12b are "neutralized," or, otherwise rendered ineffective while the generalized feedback couplings, $K+_{13,a}$ and $+K_{13,b}$, respectively, between coil $L_{11}$ and each of the coils 12a and 12b are vanishingly small by comparison with the respective "forward" couplings, $+K_{31,a}$ and $+K_{31,b}$. The outputs of pentode tubes 98 and 99 are fed from the anodes of the tubes to two sections 12a and 12b of coil 12. The two sections of coil 12 have a common terminal which is connected to ground through condensers 83 and 84. The output of pentode $P_s$ is connected across condenser 137 and coil $L_{11}$ which are tuned to exact resonance. The other terminal of coil $L_{11}$ is grounded. The output of the transformer is taken from coil $L'_{33}$ which has one terminal grounded and the other terminal connected through a condenser $C'_{33}$ to a parallel resonant circuit $C_{33}$, $L_{33}$ forming the input of a suitable receiver. FIG. 10 shows the reduction to practice of the said coil set in symbolic form connected to the balanced modulator 98, 99, of FIG. 8. A modified special transformer embodying the same principles as that of the transformer of FIG. 3 is used; the crossed coil 12 of the latter is merely split into two sections, 12a and 12b, the outer ends of which connect to the modulator tubes 98 and 99, and the inner ends of which form a junction which is grounded over the filter capacitors 85 and 86.

FIG. 10 shows circuit connections similar those of FIG. 8 between a blanced modulator 98, 99 and a receiver. The split coil 12 has sections 12a and 12b which are connected to the anodes of tubes 98 and 99. The coil 13 is connected to the ouput of pentode tube $P_s$, as indicated in FIG. 8. Coil 11 of the transformer is connected to the control grid of a tube 146, preferably of the pentode type, through an inductance $L_{33}$. A tunable condenser $C_{33}$ is connected between the control grid and ground.

Figure 2A:
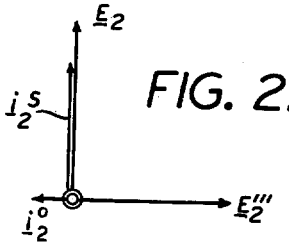
FIGS. 2A and 2C are vector diagrams showing voltage and current relationships of the loop and sense antenna input circuits, respectively.

Referring now to FIG. 2A, there is shown a vector diagram for the equivalent circuit of the loop antenna, the primary current $i^o_2$ flowing through coil 101 in FIG. 8, which is seen to be of a purely capacitive nature; because of the short loop feeder cable length, the circuit loss angle is negligible. The current $i^s_2$ leads the induced loop E.M.F. $E_2$ by fully $+90°$. The natural period of the equivalent circuit $f^o_{o2}$ is far above the upper end, $f_{hi}$ of the frequency range, since the loop consists of a few turns of extremely small diameter only. The parallel circuit combination becomes, therefore, equivalent to a capacitance.

Since the secondary circuit 102 and 103 (FIG. 8) is resonance tuned, its circulating current lags 90° behind the primary current $i^o_2$ and the voltage across the variable tuning condenser 103 is equal to $$E'''_2 = i^s_2 \frac{1}{+jwC}$$

in which $i^s_2$ is the circulating current flowing in the secondary circuit and $w$ the period of oscillation in radians. Hence, $E'''_2$ lags 90° behind the loop E.M.F. $E_2$ and ought to, by this reason, fall into phase alignment with the induced sense antenna E.M.F. $E_1$.

Figure 2B:
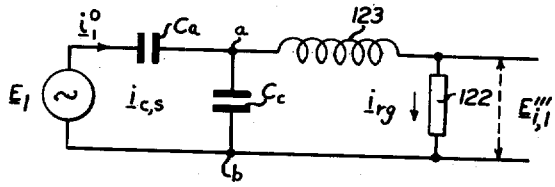
FIG. 2B is an equivalent circuit diagram of the sense antenna input circuit.

Referring now to FIG. 2B, there is shown an equivalent circuit diagram of the sense antenna input circuit of FIG. 8. Due to considerable sense antenna feeder cable losses the sense antenna current $i^o_1$ is not of the nature of a purely capacitive current but the phase $I^o_1$ with respect to $E_1$ is $(90-\Delta\varphi)° = \varphi_{11}°$ (see FIG. 2C). The current $i^o_1$ splits up into two components; a purely capacitive component $i_{c,s}$ flowing across the cable capacity $C_c$ and a component $i_{rg}$ flowing through the series connection of the R.F. coil 123 and the grid resistor 122.

Figure 2C:
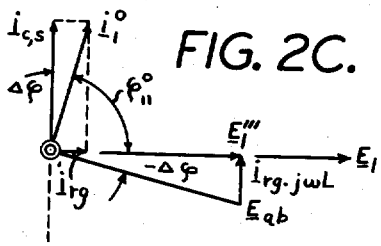

In FIG. 2C, which represents a vector diagram of the events taking place in the equivalent circuit diagram of FIG. 2B, the current $i^o_1$ is shown to have a leading phase with respect to the induced E.M.F. $E_1$, being composed of the components $i_{cs}$ and $i_{rg}$, $i_{c,s}$ being at a 90° leading angle and $i_{rg}$ at a zero angle with $E_1$. Without the R.F. inductance 123 the voltage drop across the terminals a and b in FIG. 2B would be 90° lagging with respect to the current $i^o_1$ so that the voltage found across the grid resistor 122 would be of an identical phase. The same phase discrepancy, $-\Delta\varphi$ appears again between the output voltage $E'''_1$ and the induced E.M.F. $E_1$.

It is possible to compensate for the said phase discrepancy, so that the output voltage $E'''_1$ at the control grid of the pentode amplifier $P_s$, falls exactly into phase alignment with the induced sense antenna E.M.F. $E_1$ and, of course, with the output voltage $E'''_2$ at the control grid of pentode $P_r$. Then, in the final analysis this is precisely the result which we are after. Thus, the series combination of R.F. coil 123 and grid resistor 122 connected in parallel with the cable capacity $C_c$, respectively, between points a and b of FIG. 2B brings about the desired result as follows:

Since the amplitude and the phase of the very small current $i_{rg}$ are mainly governed by the generally high resistance 122, it will be practically at an angle of 90° with respect to the charging current $i_{c,s}$ flowing across the cable. The voltage $E_{ab}$ across [points] *points* a and b will divide up into two components: $i_{rg}, R_g$ and $I_{rg}, jwL$. Provided that we have selected the proper value of inductance for 123 (between 20 and 50 microhenries) the voltage drop across the grid resistor, which now has become the output voltage $E_1'''$ can be made to fall in phase with the induced E.M.F., $E_1$ and, with it, the output voltage $E_2'''$ of the loop input circuit in FIG. 8.

With voltages $E_2'''$ and $E_1'''$ fed, respectively, in phase to the pentode amplifying tubes $P_r$, and $P_s$, we may construct the respective output circuits of these tubes so that their no-load voltages at the plate electrodes are still in phase with each other. The input circuits, respectively, of the modulator tubes 98 and 99 represent, practically, resistive loads, consisting of grid resistors 72 and 73, since the series capacitors 75 and 72 have a negligible reactance in comparison therewith. The plate currents flowing in the output circuit of said pentodes have for all practical purposes, the same phase as the respective control grid input voltages at terminals 76 and 77, because of the small inductance values assigned the two crossed coil halves 12a and 12b. From this it follows that said output currents flowing through the crossed coil halves have the identical phase as the phase of the voltage at the plate terminal of the loop pre-amplifying tube $P_r$.

Since the plate load of the sense antenna pre-amplifying tube $P_s$ is equal to a resistance, i.e., the parallel impedance of the resonance tuned plate circuit comprising the coil halves 13 as load inductances, the current flowing through the parallel circuit is of the same phase as the current flowing through said crossed coil halves 12a and 12b. But between the circulating current flowing in the resonance tuned output circuit of tube $P_s$, and said current flowing through the crossed coil halves 12a and 12b there exists a phase difference of precisely 90° which satisfies the phase relationship: $\beta=\alpha+90°$ and corresponds, actually, very closely with the specific dual set of values: ($\beta=-90°$, $\alpha=0°$), the constant 90° phase shift occurring between the respective output currents of the sense and loop antenna network in the special transformer of FIGS. 8 and 10.

Referring now again to FIG. 12 which, as we know, is derived by way of forming a "mathematical dual" of the inductive type of coupling structure such as indicated in FIG. 1, we would, if replacing the active networks I and II and the whole coupling structure with branch circuits $M_{12}$, $M_{13}$ and $M_{23}$ with two resistors, say, $R_1$ and $R_2$ with one end each joined together at the node c while the other two ends are connected individually to the current sources $I_1$, and, respectively, $I_2$ and, furthermore, if replacing the impedance $Z_{33}$ between node c and the datum junction j with another resistor $R_3$, obtain a network generally known in electronic computer engineering as a "parallel-input adding network."

The assumption goes, in accordance with literature on this subject, that the current $I_3$ found at the common point of coupling c will then be equal to: $I_3=a.I_1+b.I_2$ in which a and b are called the "weighting factors."

In practice, however, the above linear equation between $I_1$ and $I_2$ is subjected to a "frequency error" because of a mutual coupling effect in the form of stray capacitances between the current sources $I_1$, $I_2$ that may exist, and because of the common resistance value $R_3$ relative to the sums $(R_1+R_3)$ and, respectively, $(R_2+R_3)$. The purpose of these arrangements is to "add" a particular wave shape of the current source $I_1$ to the current $I_2$ which may, or may not, be different from that of $I_1$; in any event the idea consists of having a "true addition" of the two wave shapes at the common point of coupling c.

Instead of interposing between the common point of coupling and a receiver input circuit a "coupling structure" such as exemplified by the circuit diagrams of FIGS. 4, 6, 8 and 10, computer engineering practices employ coupling structures of a different kind to overcome mutual coupling effects (interaction) between the voltage or current sources which are to be "added" in linear fashion.

One classification of computer circuits employs vacuum tube circuits with a, respectively, "balanced input" using the effects of negative feedback either of the cathode or plate "follower" types and have the one feature in common with the circuits described so far, basically, that the correction for frequency errors (distortion of the individual wave shapes of the current or voltage sources to be added) is performed ahead of the point of coupling to the evalution networks. We have given these circuit arrangements the classification (A) of "single systems" because they are reducible, basically, to the network configuration shown in FIG. 12, and, in particular to the mathematical equivalent of FIG. 5B.

Another classification of computer circuits employs a single negative feedback amplifier of the plate "follower" type in which the correction for frequency errors during the addition of current and voltages sources of different or like wave shapes is performed after the point of coupling. This type of circuit arrangement is given the classification (B). Basically, they are, insofar as the required parameter conditions of the input circuits, respectively, between the common point of coupling and said voltage or current sources are concerned, again reducible to the network configuration of FIG. 12, and to the mathematical equivalent of FIG. 5B.

A third classification of computer circuits employs orthogonal inputs of the voltage or current sources to be added, respectively, in "bridge adding networks," in particular, of the equal arm bridge variety. The obvious intent here is to avoid, by the orthogonal method of coupling the voltage or current sources, a mutual undesirable coupling, respectively, between said sources, to begin with, and this, without the use of negative feedback action above referred to. This classification of circuit arrangement is given the designation (C). Basically, the intent of rendering ineffective the "generalized, individual coupling pair" between the said sources is identical to that symbolized in the mathematical equivalent shown in FIG. 5B.

The "junction network" of FIG. 12 (in distinction to the "loop network" of FIG. 9A) can be used to advantage, however, to eliminate frequency errors without the use of negative feedback while, basically, the mathematical equivalent form is again that of FIG. 5B. A basic circuit diagram of this kind will now be described and reference is made to FIG. 13, which shows a variable resistor R (potentiometer) connected orthogonally to the midpoint of a resonance-tuned circuit consisting of a coil with inductance L and a "differential condenser" $C_d$ which is balanced to ground. Thus the capacity of said condenser $C_d$ is represented by the branch $M_{12}=M_{21}$ plus such stray capacitances $C_{12}$ that may be found in the receiver chassis in parallel therewith (see FIG. 12). The branches $M_{31}=M_{13}$ and $M_{32}=M_{32}$, both, are represented by half the inductance, L/2, of the said inductance L, while R is thought of being represented by the circuit branch with impedance $Z_{33}$, respectively, between node c and the datum junction j in FIG. 12. The nodes a and b connect, of course, to the internal output admittances $Y_a$ and $Y_b$ respectively, and it is clear that the sum of the voltage drops $(e_{01}-e_{31})$, between nodes a and c, plus $e_{31}$, between the node c and ground g, is equal to the output voltage $e_{01}$.

Figure 13:
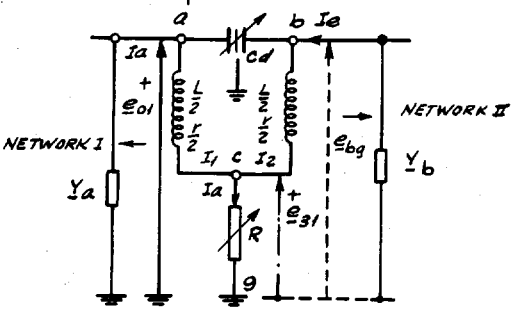
FIG. 13 shows the basic elements of a specific embodiment of the invention, derived from FIG. 12, in the form of a novel coupling structure for direction finders.

In distinction to the operation of the parallel feed system shown in FIG. 4 in which the coupling between nodes corresponding with those in FIG. 13, i.e., nodes a and b is eliminated by way of "neutralization" of such lumped chassis capacities that might appear between said nodes with an appropriately adjusted mutual inductance, the "residual" coupling consisting of the remaining two "critically adjusted" couplings, respectively, in series with the collector network III (synonymous with the product $(K_{31},K_{32})_{+jw}$ in FIG. 5B) is also rendered "ineffective" by the circuit arrangement of FIG. 13.

The operation of the coupling structure is as follows: a current $-I_a$, entering the resonance-tuned circuit L, $C_d$ at the node a, must cause voltage drops, respectively, between nodes b and c, and between node c and ground g. These voltage drops are made exactly equal and phase-opposed, so that the voltage $e_{bg}$ between nodes b and g is equal to zero. At the same time, if a current, $-I_b$, would be entering said circuit L, $C_d$ at the node b, no voltage would be developed between nodes a and g. This operation is, however, true to fact, if in each instance we are entitled to assume a "no load" condition, respectively, between nodes b and g with $I_a$ active, and between nodes a and g with $I_b$ active; i.e., theoretically, the output admittances $Y_a$ and $Y_b$ should be equal to zero.

With these assumptions, therefore, the mutual antennae energy transfer from one active network, say, connected at the node a to another active network connected at node b is made effectively zero, or, we may say that the respective individual system functions $(K_{12},K_{21})_{+jw}$ between the antennae networks I and II fulfill the "functional" requirement (I) with respect to its first stipulation, and this, at each resonance setting of circuit L, $C_d$, provided, as we shall see shortly, that the variable resistor R is adjusted at each operating frequency to a value of ¼ of the parallel resonance impedance:

$$R=\frac{1}{4}\cdot Z_{ab}=\frac{1}{4}\cdot w_o.L.Q_o \qquad (2)$$

in which $$w_o=2.\pi.f_o, \text{ and } Q=\frac{1}{w_o.C_d.r}$$

and r is equal to the R.F. resistance of the inductance L.

The operation is more clearly indicated by the vector diagrams of FIGS. 13a, 13b and 13c, in which FIG. 13a shows, that at the junction c the current $+I_a$ leaving the junction is equal to the current $-I_1$ entering the same, plus the current $I_2$ leaving it. The current $I_a$ is plotted in direction of the positive x axis. The voltage drop across the resistor R is equal to $I_a.R$ and falls into the same direction, while the voltage drop across half the inductance L/2 between nodes a and c is equal to: $I_1(r/2+j.w(L/2))$, so that the sum of $e_{ac}$ and $e_{cg}$ is equal to: $I_a.R+I_1(r/2+j.w.(L/2))=e_{ag}=e_{o1}$, developed across the output admittance $Y_a$, say, of the active network I (not shown).

FIG. 13b, shows the voltage vector $e_{bc}$ developed between nodes b and c: $e_{bc}=I_2.(r/2+j.w(L/2))$, and in FIG. 13c, is shown the sum of the voltage components, $e_{cg}+_{bc}$, so that $e_{bg}$, the voltage developed between nodes b and g, becomes very nearly equal to zero, provided we make: $I_a.R=I_2(r/2+j.wL/2)$.

The voltage transfer ratio $$e_{bg}/e_{ag}=E_{bg}/E_{ag}.e^{+j(\theta_{bg}-\theta_{ag})}$$

which is found across the coupling path ($M_{12}=M_{21}$) between nodes a and b of the coupling structure shown in FIG. 13 becomes, therefore, for all practical purposes equal to zero, both with respect to the amplitude and phase function. D. B. H. Tellegen, in his article, "Gegenkopplung," Techn. Rundschau, Philips A.G., vol. 2 (1937), pages 289–294, has shown that, if the value of R in FIG. 13 is made equal to that given by Equation (2) above, the "transfer impedance," $Z_{o,+jw}=e_{bg}/I_a$, is equal to:

$$Z_{o,+jw}=\frac{Q}{4.w_o.C_d}\cdot\frac{1}{\sqrt{1+\beta_o^2.Q^2}} \quad (3)$$

in which $\beta_o=(w/w_o-w_o/w)$, so that for $w=w_o$, the angular resonance velocity of the signal frequency $f_o$ of the circuit $L,C_d$, the value of the tuning constant $\beta_o$, is equal to zero. A zero output voltage, $e_{bg}$, is obtained at each and every current $I_a$ entering node a of the coupling structure. For practical applications, at very high opearting frequencies in the 100 to 425 megacycle spectrum of the Ilas instrument approach system, it is very difficult to simulate the performance of the resistor R as that of a pure ohmic R.F. resistance, especially in the case where a potentiometer is used. R is usually of a value of 50,000 to 100,000 ohms, so that distributed capacity across it strongly modifies, both, amplitude and phase of its equivalent admittance, becoming frequency dependent.

A coupling structure is therefore shown in FIG. 14, in which the resistor R in FIG. 13 is replaced by the parallel-resonance impedance of a second resonance-tuned circuit, connected in the same orthogonal fashion. FIG. 14, furthermore, shows a circuit diagram in connection with a balanced modulator circuit, a receiver network, and the diagrammatic view of the remaining parts of a complete high frequency input system, operable in the operating range of from 100 to 425 megacycles. Thus, the non-directional amplifying network I comprises the non-directional antenna (1) connected to the first control grid 1 of the pentode $P_{k,1}$ over a transmission line 1c, to the primary winding $L_{1,1}$ of an electrostatically shielded ($S_1$) high frequency transformer $T_{1,1}$, the secondary winding $L_{1,2}$ of which is resonance-tuned by the variable tuning condenser $C_{1,1}$, which is shown connected in series with the padding condenser $C_{1,2}$ and the low potential end of the secondary winding $L_{1,2}$, the junction between $C_{1,2}$ and $L_{1,2}$ being grounded over the blocking condenser $C_{B,1}$.

The plate output voltage of pentode $P_{k,1}$ enters at point 19 a phase shift network 5 shown in block form, in which its phase is turned by a constant, frequency-independent angle of 90°. The phase shift network 5 connects at its output with terminal a25 of the coupling structure P'', comprising two orthogonally connected resonance-tuned high frequency circuits, both being provided with padding condensers, respectively, $C_{1,3}$, $C_{1,4}$ and $C_{1,5}$, in order to obtain a band-spread effect for a frequency range, say, of 98 to 112.5 megacycles over the tuning dials of the variable differential condenser C13 and the variable, single ground-ended condenser C12 so as to conform with the electrical band spread of the variable condenser $C_{1,1}$ which is also provided with a padding condenser, respectively, $C_{1,2}$ as indicated above. Thus electrical and mechanical tracking of the resonance-tuned circuits just described is attained, as indicated by the respective variable condensers and the tuning crank K, all of them connected with dash-dotted lines. An AVC bias control is furnished the first control grid 1, of the pentode amplifying tube, $P_{k,1}$.

The directional antenna (2) of amplifying network II feeds its energy over a shielded transmission line 2c, to the primary winding $L_{2,1}$ of a high frequency shielded ($S_2$) transformer $T_2$, the secondary winding $L_{2,2}$ of which is tuned to resonance by padding condensers $C_{2,5}$ and $C_{2,6}$ in series with the differential variable tuning condenser C14. Thus, the directional carrier voltage of this circuit feeds the two first control grids 37, 38 of pentode $P'_{k,2}$ and, respectively, $P''_{k,2}$ in push-pull fashion, the latter tubes which, in connection with the low frequency modulation-signal source 6 feed the second control grids 51, 52 thereof, likewise in push-pull fashion. $P'_{k,2}$ and $P''_{k,2}$ form a "balanced modulator circuit," with its differential signal output connected to terminal b26 of the coupling structure P''. The variable differential condenser C14, by virtue of padding condensers $C_{2,5}$ and $C_{2,6}$ has the identical band spread of the variable tuning condensers $C_{1,1}$, C12 and C13 and is also mechanically and electrically ganged with them (as shown by the dash-dotted line).

The variable condenser C12 and padding condenser $C_{1,5}$ tune the orthogonally connected inductance L11 to resonance, respectively, in the same way the condensers $C_{1,3}$, $C_{1,4}$ and the variable differential condenser C13 tune the two coil halves $$\frac{L}{2}9 \text{ and } \frac{L}{2}10$$

to resonance. Blocking condensers $C_{B,52}$ and $C_{B,23}$ enable feeding the plate electrodes of pentodes $P_{k,1}$, $P'_{k,2}$ and $P''_{k,2}$ with a (+) D.C. source over the filter resistor R2.

The output of the orthogonally connected circuit, L11; C12; $C_{1,5}$ connects at the junction point 44 over the stopping condenser $C_{B,23}$ to the first control grid 43 of pentode $P_{k,3}$, which takes over the function of a detector-amplifier and frequency converter, a grid leak $R_{g,7}$ connecting said control grid to ground. A second control grid 47 connects to the crystal heterodyne oscillator 22 over the frequency doubler stage 23.

The quiescent point of operation of the balanced modulator circuit is adjusted and balanced, respectively, between the two pentodes $P'_{k,2}$ and $P''_{k,2}$ by the potentiometer P22. Blocking condensers $C_{B,49}$ and $C_{B,50}$ form R.F. by-passes for the cathodes 39, 40 of said pentodes, respectively, to ground.

Thus, the directional antenna network II produces no voltage between point a25 of the coupling structure P'' and ground; nor can the non-directional network I produce a voltage between point b26 of the coupling structure $P''_2$ and ground.

Because of phase shift network 5, antenna voltage components derived from antenna () and antenna (2), having an initial 90° constant and frequency-independent phase difference between them will appear, respectively, at said nodes, a25 and b26, in phase relative to each other while, at the same time, the amplification factors of pentodes $P_{k,1}$, $P'_{k,1}$ and $P''_{k,2}$ are, respectively, adjusted so that the derived amplitudes of the two antenna signals, $e_{31}(t)=t_{11}(t)$ and $e_{32}(t,\delta)=e_{22}(t,\delta)$ in the maximum signal pick-up direction of the directional antenna (2), i.e., $\delta=0°$, and, $\delta=+180°$, become equal to each other.

At the junction, or, node c27 of the coupling structure P'', these signals become truly algebraically "additive" by virtue of the characteristic property of the coupling structure, which is to stop all mutual antennae energy transfer between the antenna networks I and II. Symbolically, the operation of this circuit, therefore, is represented by the mathematical equivalent of FIG. 5B, in which the individual system functions $(K_{12},K_{21})_{+jw}$ are ineffective and where the individual system functions, $K_{31,+jw}$ and $K_{32,+jw}$ are rendered equal by virtue of the inherent system symmetry of the arrangement of FIG. 13.

In order that the "principle" requirement of phase alignment condition (mm) may be fully assured of being met with in practice, the same remarks with respect to the phase constants $\alpha$ and $\beta$, respectively, of the antennae networks I and II, as those made when explaining the operation of the circuit diagram of FIG. 4 are applicable.

The stray capacitances between the antennae networks I and II that are generally found to exist in the receiver chassis (see FIG. 12), being in parallel with the admittance wpath between the nodes, a25 and b26 of FIG. 13, including those existing between wiring, and those existing individually between the antenna networks I and II, respectively, outside of the receiver chassis, are, now, instead of being "neutralized" (FIG. 4) comprised in the total tuning capacity which, together with that of the variable differential condenser C13 and the padding condensers, $C_{1,3}$ and $C_{1,4}$, is essential to tune the coil inductance halves $$\frac{L}{2}9 \text{ and } \frac{L}{2}10$$

to resonance. Similarly, such un-avoidable stray capacitances, as of the respective wiring of networks I and II, respectively to ground being resolvable into two "equivalent lumped" capacitances $C_{1,g}$ and $C_{2,g}$ (FIG. 12) will appear reflected, respectively, in parallel with the admittance branches between the nodes a25 and b26 to ground. They are comprised in the total tuning capacity which, together with the variable tuning condenser C12 and padding condenser $C_{1,2}$ is essential, to tune the coil inductance L11 of the orthogonally connected network to resonance.

I come now to discuss a coupling structure which is also of the classification (A) of single systems and quite similar in appearance to that shown in FIG. 14 but which, technically, operates under entirely different conditions, in so far as rendering ineffective the individual system functions, $K_{12,+jw}$ and $K_{21,+jw}$ is concerned. The system of FIG. 14, employs as can be seen, +self biasing of the grid potentials, respectively, in the two pentodes $P'_{k,2}$ and $P''_{k,2}$ by means of the two cathode half resistances of potentiometer P22, by-passed by condensers $C_{B,49}$ and $C_{B,50}$, as well as in pentode $P_{k,1}$ which also uses a by-passed cathode resistor (not shown).

If these self biasing cathode circuits are replaced by a single non-by-passed cathode resistor connected, respectively, between the two cathodes, joined together, and ground, we shall create thereby what is known in electronic computer engineering as a "differential negative feedback action 'common to the well known' differential amplifiers." It is understood, of course, that, if put to use at very high radio frequencies, amplifiers of this kind must be modified in their plate and cathode terminations to embrace, instead of the usual run of carbon resistors, high frequency resonance-tuned circuits so as to be assured of the truly "R.F. resistive character" of the element thus replaced.

The said negative fedback action, when considered differentially between the plate electrodes of the pentodes $P_{k,1}$ and, respectively, $P'_{k,2}$, $P''_{k,2}$ results in a decrease of the grid input impedances to such an extent that, say, a step function E(1) applied at grid 1 of pentode $P_{k,1}$ will hardly affect the plate potential at the junction *b*26 (pentode $P'_{k,2}$ and $P''_{k,2}$ considered "passive" for the moment) at all. Conversely, the same holds true for the plate potential at the junction *a*25 of pentode $P_{k,1}$ (considered momentarily passive) if a similar step function $E_2(1)$ would be applied differentially between the control grids 37 and 38, respectively, of pentodes $P'_{k,2}$ and $P''_{k,2}$. In other words, if the respective input potentials at the control grids 1 and, respectively, 37, 38 can be assumed of being periodically in a +90° and +270° phase quadrature condition with respect to each other, a corresponding 0° and +180° in-and out of phase condition will exist, respectively, between the plate potential at the junction *a*25 and, respectively, at the junction *b*26, as though no individual system function, or, generalized, individual coupling pair $K_{12,+jw}$ and $K_{21,+jw}$ would exist between the two antennae networks. This feature is of considerable importance in connection with time-modulated transmitted signals to indicate distance of the aircraft from the airport transmitters (Dme-Vor system).

Figure 15:
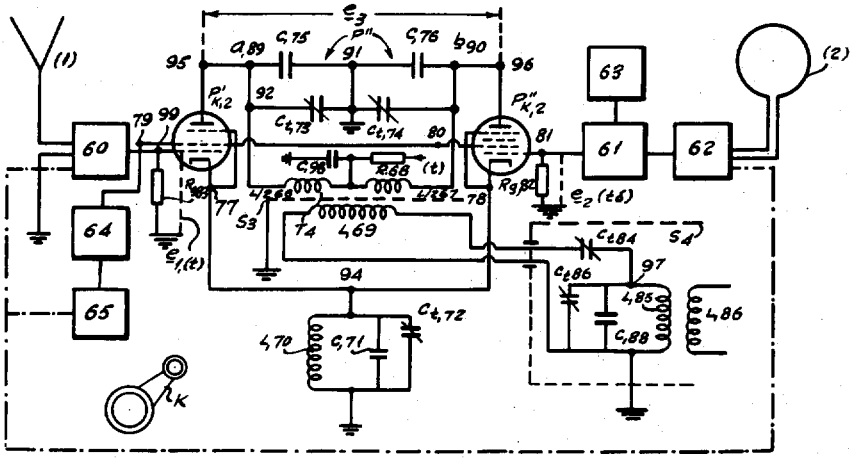
FIG. 15 shows the wiring diagram of a radio direction finder which may be made to operate in the 100 megacycle frequency spectrum, using the principle of coupling shown in FIG. 13.

Referring now to FIG. 15, the coupling structure P'', or "adding and subtracting circuit" as termed in electronic computer engineering, is again seen to comprise two orthogonally connected resonance-tuned circuits, constituting, in so far as the operation of the same is concerned, two effective parallel-resonance impedances equal to that of pure R.F. resistances. The arrangement is similar to that of FIG. 14, except that one of said orthogonally connected resonance-tuned circuits forms the common cathode circuit of the pentode-converter tubes $P'_{k,2}$ and $P''_{k,2}$, the cathodes 77, 78 being connected at the node 94, and said cathode circuit comprising tuning inductance L70, capacitor C71 and trimmer condenser $C_{t,72}$. The other resonance-tuned circuit is connected at terminals *a*89 and *b*90 to plate electrodes 95 and, respectively, 96 of said pentodes $P'_{k,2}$ and $P''_{k,2}$ and comprises capacitors C75 and C76 which are balanced to ground with trimmer condensers $C_{t,73}$ and $C_{t,74}$, and the primary coil inductance halves $$\frac{L}{2}66 \text{ and } \frac{L}{2}67$$

of a high frequency (I.F.) differential output transformer $T_4$. Transformer $T_4$ is electrostatically shielded between primary windings $$\frac{L}{2}66 \text{ and } \frac{L}{2}67$$

respectively, and the secondary winding L69. The electrostatic shield ($S_3$) is grounded. Secondary winding L69 forms part of an "intermediary circuit" same as that employed in FIG. 4, with trimmer condenser $C_{t,84}$ connected to the high potential end, 97, of the first I.F. stage of the receiver network III, respectively, in series therewith. The filter combination, R68 and C98, permits the providing of the necessary D.C. plate supply for the plate electrodes 95, 96 of pentodes $P'_{k,2}$ and $P''_{k,2}$. The two first control grids, 99 and 81, respectively, of pentodes $P'_{k,2}$ and $P''_{k,2}$ are each connected over the grid leak resistors, $R_{g,83}$ and, respectively, $R_{g,82}$ to ground.

The said grids are also seen to connect, in parallel therewith, to the R.F. amplifier 60 on the one hand, and to the combination of a balanced modulator and 90° phase shift circuit 61, with the R.F. amplifier 62 in series with said combination. R.F. amplifiers 60 and 62, in turn, connect to the non-directional antenna (1) and the directional antenna (2). 63 provides the balanced modulator and 90° phase shift circuit 61 with the required modulation potential source (same, or similar as in FIG. 14).

Prior conversion of the high frequency antenna input signals to the coupling structure, $e_{11}(t)$ and $e_{22}(t,\delta)$ is effected to render corresponding I.F. antenna signal components therewith in the plate output connections of pentodes $P'_{k,2}$ and $P''_{k,2}$ leading to the input nodes, a89 and b90, of the coupling structure P''. It is seen that the second control grids 79 and 80 of said pentodes are joined together, the junction connecting to the crystal oscillator source 65, over the frequency-doubler stage 64. Receivers of this kind, in so far as crystal-control operation is concerned, are extensively used in connection with omni-directional radio range beacon transmitters (Vor) and also in the Ilas instrument landing approach system. They are usually provided with a switching mechanism, to selectively insert crystals tuned to different operating frequencies within the customary operation spread of frequencies allocated in the region of from approximately 98 to 112.5 megacycles.

Thus, as the received carrier signals contained in the R.F. amplifiers 60, 62 are tuned by means of variable tuning condensers comprised therein (not shown) to a predetermined set of Vor transmitting frequencies within the allocated frequency range, respectively, through the single control knob K which (dash-dotted line) is seen connected to said networks 60 and 62 another mechanical connection between it and the switching mechanism in the crystal controlled oscillator assembly 65 (not shown) selects the proper heterodyne crystal corresponding with the predetermined carrier signal received, to give, for every selection, the required I.F. frequency to which the two referred to, orthogonally connected resonance-tuned circuits in the coupling structure P'', are adjusted. The operation of the circuit is quite well known among those skilled in the art of electronic computer mechanisms. It may be briefly stated, that the I.F. differential output signal $e_3(t,\delta)$ appearing between terminals a89 and b90 may be written:

$$(4) \qquad e_3(t)=\frac{\mu.R_L}{r_D+R_L}\cdot(e_{11}(t)-e_{22}(t,\delta))$$

in which (a) $R_L=\frac{1}{2}\cdot w_o\cdot\frac{L}{2}\cdot Q$, i.e., equal to half the parallel-resonance impedance of the circuit between terminals a89 and b90.

(b) $\mu$=amplification factor of the balanced tubes $P'_{k,2}$ and $P''_{k,2}$, (c) ($r_p$=plate resistance, respectively, of pentodes $P'_{k,2}$ and $P''_{k,2}$.

In both cases of FIG. 14 and FIG. 15, the successful operation of the "adding," and, respectively, "subtracting" high frequency mixing circuits (coupling structure P'') performs a generalized sort of addition or subtraction in which the derived output ($e_{31}(t)$, $e_{32}(t,\delta)$) is a linear function of the antenna input signals (E.M.F.'s) $E_1$, $E_2$, rather than simply a sum or difference of the same. The circuit arrangement of FIG. 15 falls, again, into classification (A) of "single systems."

In electronic computer engineering the general operation considered, when adding two signals, is usually symbolically represented by: (as applied for instance to antennae signals)

$$(5) \qquad e_3(t.\delta)=e_{11}(t)+e_{22}(t,\delta)=a,E_2+b,E_2$$

in which the factors, a and b, are assumed to represent constant parameter values and are given the special term: "weighting factors." Since we arrive at the summation signal $e_3(t,\delta)$ quite similarly, by, respectively, adding the products of our "generalized, total couplings" with the respective voltage sources (E.M.F.'s of antenna (1) and (2)) thus, $e_3(t,\delta)=K^t_{31,+jw}\cdot E_1+K^t_{32,+jw}\cdot E_2$, the "total system functions," "weighting factors" and "generalized total couplings" are seen to have, all, similar physical significance. (In the case of the elimination of $$(K_{12},K_{21})_{+jw}$$

the above relation changes into:

$$C_3(t;\delta)=K_{31,+jw}\cdot E_1+K_{32,+jw}\cdot E_2$$

In high frequency input systems, or, coupling structures, employing negative feedback, say, of the type found in cathode follower circuits, the individual weighting factors become smaller than the numerical value of 1. This then, is the price which one must pay, as in the case of an "energy sink" referred to in connection with conventional high frequency input systems (see FIG. 7) if we wish to compensate (in this case) for undesirable phase shifts in the coupling structure that normally would occur when resorting to the cathode follower method of coupling. In this respect, the use of differential amplifiers as a coupling structure has definitely its advantages. Equation 4 shows that amplification is obtainable although, there is the disadvantage of having to resort to additional resonance tuned circuits, as in FIGS. 14 and 15.

It is, of course, not necessary to resort to orthogonally coupled high frequency resonance-tuned circuits referred to, if the cathode follower principle in connection with the classification (A) of parallel-input networks of "single systems" is resorted to. This will now be explained.

Figure 16:
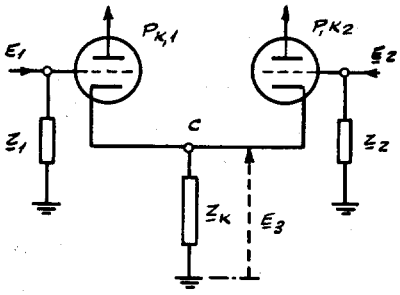
FIG. 16 shows the application of a differential amplifier as a coupling structure.

One of the most useful, and simple methods of electronic addition of voltages derived from different sources consists in feeding the signal voltages over networks that are connected in parallel to the input circuits of two cathode amplifying tube circuits with a common cathode return to ground, respectively, over a cathode impedance. The basic schematic circuit is shown in FIG. 16.

An analysis of the circuit may be readily made, both for sinusoidal and transient signal input voltages, provided that the performance characteristics of the two pentodes, $P_{k,1}$ and $P_{k,2}$ are alike. Successful operation of the circuit arrangement with sinusoidal signal inputs of very high frequencies depends upon the degree of effectiveness with which we can assume the cathode impedance $Z_k$ between point c, and ground to operate after the fashion of an effective R.F. resistance. This holds true also for the input impedances $Z_1$ and $Z_2$ that are seen connected between control grid terminals 1 and 2, respectively, and ground. Designating the amplification factor of each pentode with $\mu$, and the signal input voltages with $E_1(t)$ and $E_2(t,\delta)$ the output voltage $e_3(t,\delta)$ across the cathode impedance $Z_k$ is found to be with good approximation, equal to:

$$(II) \qquad e_3(t,\delta)=\text{proportional with: }\frac{\mu}{2.(\mu+1)}\cdot(E_1+E_2)$$

in which $\mu$ is the tube amplification factor. Again it is seen that the input signal voltages are algebraically additive, respectively, between associated circuit networks that may be connected to the three input terminals 1, 2 and c, of the cathode follower arrangement.

Figure 17:
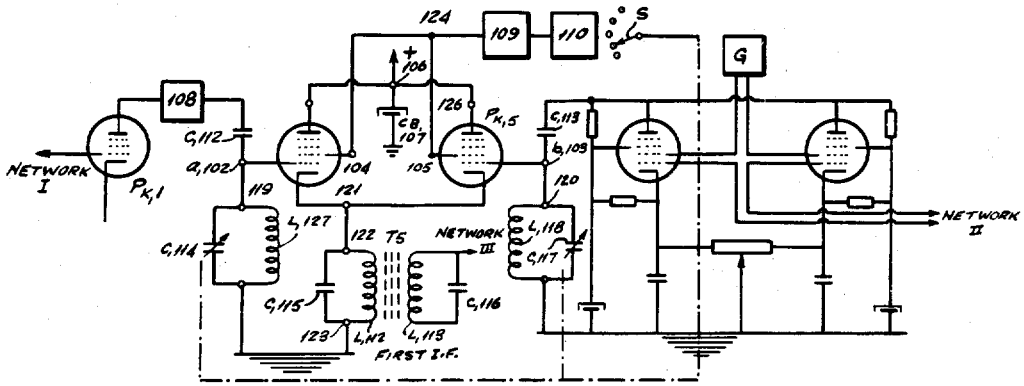
FIG. 17 shows a circuit using a cathode follower amplifier as a coupling structure between the antenna and the receiver networks.

FIG. 17 shows the schematic circuit diagram of an application of the basic circuit arrangement shown in FIG. 16, being somewhat similar to that shown in FIG. 15.

The cathode impedance $Z_k$ in FIG. 16 is here replaced with the primary side of the first I.F. transformer $T_5$, consisting of fixed capacitor C115 and primary I.F. inductance L112, both tuned to resonance for sinusoidal signal inputs of angular I.F. velocity, $w_{o,1}=2.\pi.f_{o,1}$, where $f_{o,1}$ is the I.F. frequency. The secondary winding L113 and fixed capacitor C116 of transformer $T_5$ are connected to the remaining circuit components of the receiver network III. The cathodes of pentodes $P_{k,4}$ and $P_{k,5}$ are joined together at the junction 122 and connect to the high potential end of the primary winding L112. Thus between the junction 121, 122 and ground there is an effective parallel-resonance impedance equal to a resistance: $R_k=w_{0,1}.L112.Q_{0,1}$ in which $Q_{0,1}$ is the "Q" factor of the primary circuit of transformer $T_5$.

The second control grids 104, 105 of said pentodes are joined together at the junction 124, and fed with a crystal-heterodyne oscillator source 110 with a number of pre-selected heterodyning frequencies corresponding with an equal number of pre-selected operating frequencies of the radio direction finder within a frequency band spread of from, say, 98 to 112.5 megacycles. A frequency doubler stage 109 is interposed between said crystal oscillator 110 and the junction 124. The plate electrodes 125, 126 of the said pentodes are joined together at the junction 106, which serves as a connection to an appropriate D.C. supply source, marked (+) and as a by-pass connection to ground, respectively, over capacitor $C_{B,107}$.

The first control grids of pentodes $P_{k,4}$ and $P_{k,5}$ are connected directly to the input terminals a102 and b103, respectively, of the coupling structure. Input impedances between said first control grids and ground are formed, respectively, for sinusoidal signal input of angular velocity $w_0=2.\pi f_0$, in which $f_0$ is the high frequency of the signal inputs. They consist of coil inductance L127 and variable tuning condenser C114, respectively, for the non-directional antenna signal input $e_{31}(t)$ to terminal a102, and the coil inductance L118 and variable tuning condenser C117 for the directional differential signal input $e_{32}(t,\delta)$ of the directional antenna (2) (not shown), to terminal b103. The latter signal input is derived, respectively, over capacitor C113, from a balanced modulator circuit identical with that shown in FIG. 8 and the remaining part of network II.

The non-directional antenna signal input $e_{31}$ is derived, likewise, in identical manner to that shown in FIG. 15, over capacitor C112 from the 90° phase shift network 108 and the remaining part of the non-directional amplifying network I (not shown). The simplicity of construction of the coupling structure of FIG. 17 by comparison with the coupling structure designs indicated by FIGS. 15 and 16 is, indeed, quite obvious. The disposition of the balanced modulator with its differential output voltage feeding the grid terminal b103 of pentode $P_{k,5}$ is quite similar to that shown in FIG. 14 and needs, therefore, no further elaborations as to its operation.

We come now to discuss in somewhat greater detail further applications of this invention, in particular, pertaining to the classification (B) of "single" systems in which corrective means for "frequency errors" within a coupling structure between the three networks, respectively, during the "addition" over a given frequency range of sense-and directional antenna signals are employed "after" the common point of coupling.

In a broad sense, these applications may in distinction to the "true series feed systems" as in the case of FIG. 6 and mathematical equivalent of FIG. 5C, be compared with "true parallel feed systems" exemplified by their mathematical equivalent of FIG. 5B, and a practical circuit arrangement thereof, FIG. 4.

Now let us suppose that in FIG. 12, the mutual circuit branch, $M_{12}=M_{21}$ is not rendered ineffective, but, that otherwise the two active networks I and II are fully "symmetrical" with respect to the point of coupling c. In this respect, the "direct" circuit branches $$M_{31}=M_{13}=M_{23}=M_{32}$$

constitute equal impedance branches with respect to the load impedance that must be thought to exist between node c and ground (datum junction j). In other words, the currents flowing through $M_{31}$ and $M_{32}$ the node c in "parallel with each other."

If we permit, say, a "step function," $E_1(1)$ to enter node 1 of network I, the amplified current across the output admittance $Y_a$ will produce a sudden change in potential across it which change, in turn, will make itself felt at the node 2 of network II, provided the individual transfer (system) function, $K_{21}(t)$ in direction from node c to the node 2 of network II is finite in value. Such shunt coupling effects as $M_{12}=M_{21}$, we can, of course, minimize, by respectively, electrostatically shielding the networks I and II from each other, counting from the input nodes 1 and 2 up to node c.

Similar considerations hold, of course, with respect to a sudden voltage change at node c, if a step function, $E_2(1)$ enters node 2 of network II, thereby affecting the voltage source at node 1 of network I, if the individual transfer (system) function, $K_{12}(t)$ in direction from node c to node 2, has a finite value.

Figure 11:
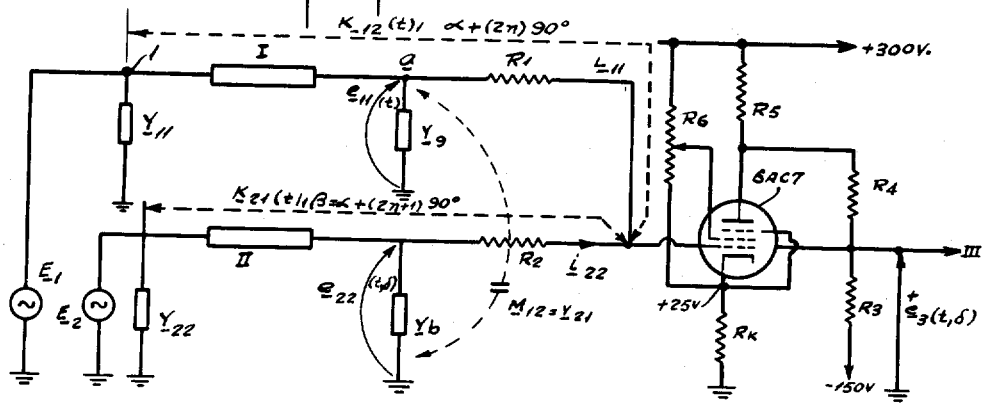
FIGS. 11 and 11a show circuits utilizing a negative feedback amplifier of the "plate follower" variety for coupling the antenna networks to the receiver network.

Referring now to FIG. 11, we assume that, as in the case of FIG. 5B the existence of a parallel-input network in which the initial requirements (pp) (b) and the modified requirement (pp) (a): $|K_{21(t)}=|K_{12}|_{(t)}\neq 0$ are complied with; i.e., we assume, quite generally, a "symmetrical design" of the active antenna networks to begin with. The coupling structure consists of the mutual circuit branch $M_{12}=M_{21}$ which is now no longer to contain a mutual "inverted" inductance component, $$\frac{-j}{w}(L_iL_j-m_{ij}^2)$$

of the symbolic expression (nn), but merely the component, $+j.w.C_{1j}$, $C_{1j}$ being the "equivalent, lumped capacitance" thought to exist directly between the nodes a and b and representing the total distributed capacitance between the active networks I and II. The circuit branches $M_{31}$ and $M_{32}$, respectively, between node c and nodes a and b are to be resistors, $R_1$ and $R_2$. The condition of symmetry requires that the output termination, $Y_a$ and $Y_b$ to ground, as well as the input terminations, $Y_{11}$ and $Y_{22}$ to ground are, respectively, equal. The phase function of network I is seen to be equal to :$\delta+(2.n.90°$, while the phase function of network II differs from it by a single phase rotation of 90°, i.e., i.e., $\beta=\alpha+(2.n+1).90°$. They are, therefore, identical to those assumed in the practical circuit arrangement of FIG. 4 (the respective sums of the "aperiodic loss angles" of the two antenna networks I and II are equal to, $\alpha$, the absolute value of which is made as small as possible consistent with equally distributed optimum minimum current losses over the system).

Figure 11A:
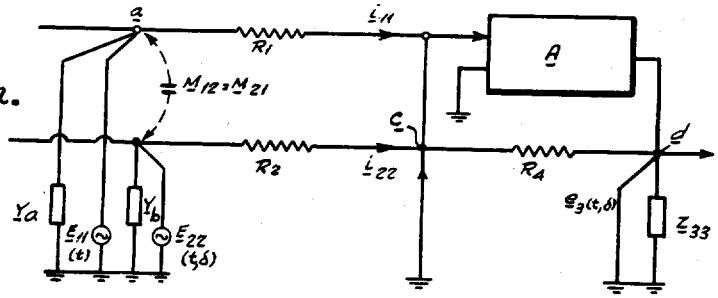

Between nodes c and d, the latter which connects to the receiver input circuit III is interposed a negative feedback amplifier of the "plate follower type." Before explaining its operation, however, we shall refer to a simplified version, FIG. 11a, being the coupling structure of FIG. 11, respectively, in block form, wherein the active antenna networks I and II of FIG. 11 are replaced by the voltage sources $e_{11}(t)$ and $e_{22}(t,\delta)$, forming the inputs to the resistors $R_1$ and $R_2$. The mutual circuit branch, $M_{12}=M_{21}$ is also noted in the figure, between nodes a and b.

While the practical application for direction finder purposes of the features of operation of the circuit of FIG. 11a appears to be unknown, the basic principle thereof is well known in literature and often referred to as the "see-saw" circuit in connection with computer problems. The following is quoted from a publication, Radiation Laboratory Series of M.I.T., vol. 19, pages 24 to 37:

A, is a negative (phase inverting amplifier) feedback amplifier, and it is shown in the above reference that, so long as, the gain A of said amplifier is such that:

$$-A.\frac{R_1}{R_1+R_2}$$

is appreciably greater than the numerical value of 1, the output voltage, $e_3(t,\delta)$ between node d and ground, may be simply expressed by:

$$e_3(t,\delta)=-\frac{R_4}{R_1}.e_{11}(t)-\frac{R_4}{R_2}.e_{22}(t,\delta) \quad (6)$$

in which the ratios, $R_4|R_1$ and $R_4|R_2$ correspond with the weighting factors, a and b of Equation 5. It is seen that the addition of the two antenna input voltage components depends solely upon said resistors, $R_1=e_{11}|i_{11}$, $R_2=e_{22}|i_{22}$ and $R_4$, but no longer upon those parameter values contained in the total system functions, $K^t_{31}(t)$ and $K^t_{32}(t)$ of the high frequency input system, respectively, "ahead" of the nodes a and b in FIG. 11. This is partly due to the said conditions, (pp) (b) and (pp) (a) that were met with above, in accordance with this invention, and, due to the following action of the feedback amplifier A which now shall be explained briefly from the above cited reference of literature:

If we let $e_{11}(t)$ and $e_{22}(t,\delta)=0$ and let the amplifier A be adjusted so that $e_3(t,\delta)$ is also zero, then, the potential at the node c will be at zero, and the currents, $i_{11}$, $i_{22}$ in FIG. 11a are, both zero. Now let $e_{11}(t)$ and $e_{22}(t)$ both be discontinuously raised to $E_1$ and $E_2$, i.e., step functions of height, $E_1$, $E_2$. As soon as this happens, and before the potential at c has had time to change (in view of the fact that there is capacity to ground at this point) currents $i_1=E_1|R_1$ and $i_2=E_2|R_2$ will flow, and will tend to raise the potential of c. But if c rises, $e_3(t,\delta)$ falls, since the amplification A of the amplifier A is negative, and a current $i_3=-e_3(t,\delta)|R_4$ flows and tends to "bleed off" the two input currents $i_1$, $i_2$ which were causing the potential at c to rise. If the input resistance to the amplifier is sensibly infinite, as is usual, the potential at c will continue to rise until the whole of $i_1+i_2$ is bled off through $R_4$ by the current $i_3$, in which case, $i_3=i_1+i_2$. The time taken to achieve this result will depend on the speed of response of the amplifier, but often it will be so rapid that it can be treated as instantaneous. The result now is that the input currents $i_1$, $i_2$ flow on past node c and traverse $R_4$, generating across it a potential difference, $-(i_1+i_2)R_4$, and if the potential at c has departed but little from zero, the output voltage will be very close.

$$(7)\qquad E_3(t)=-R_4.(i_1+i_2)=-\left(\frac{R_4}{R_1}\right)\cdot E_1-\left(\frac{R_4}{R_1}\right)\cdot E_2$$

The function of the amplifier is, of course, to render ineffective the individual system functions, $K_{21,+jw}$ and $K_{12,+jw}$ and it does this to the extent of the final departure from zero of the potential at the node c. This departure is equal to the "error signal" $e_3(t)|A$ and by making the amplification large enough the two individual system functions become zero. It is clear, of course, that, since the device will operate in the above manner with step functions it will by the same token do so for any wave shape, including that of the sinusoidal ones generally considered in radio transmission for direction finder purposes.

Referring now to the negative feedback amplifier for computer purposes, arranged between nodes c and d of FIG. 11, being of a single stage of a "high $-g_m$ type," such as 6AC7 pentode, for instance, the cathode potential across $R_k$ is usually held at +2.5 volts (to prevent grid current), and the screen grid potential at the center arm terminal (adjustable) of the potentiometer $R_6$ is adjusted so that for $e_{11}(t)=0$ and $e_{22}(t)=0$, the output voltage $e_3(t)$ is zero also.

The device does of course not correct for frequency errors in the form of deviations from the principal requirement of the phase conditions (mm) that are due to deviations of the symmetry between the active networks I and II, neither does any of the practical circuit arrangements discussed profess to do this. All these novel high frequency input systems can do, is to sustain the principal phase alignment condition (mm) over a given frequency range, if said antenna networks were designed in accordance with the symmetry conditions of this invention (pp) above.

Figure 18:
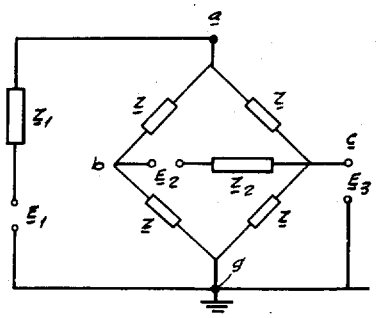
FIG. 18 is a schematic diagram of a bridge type coupling circuit.
Figure 19:
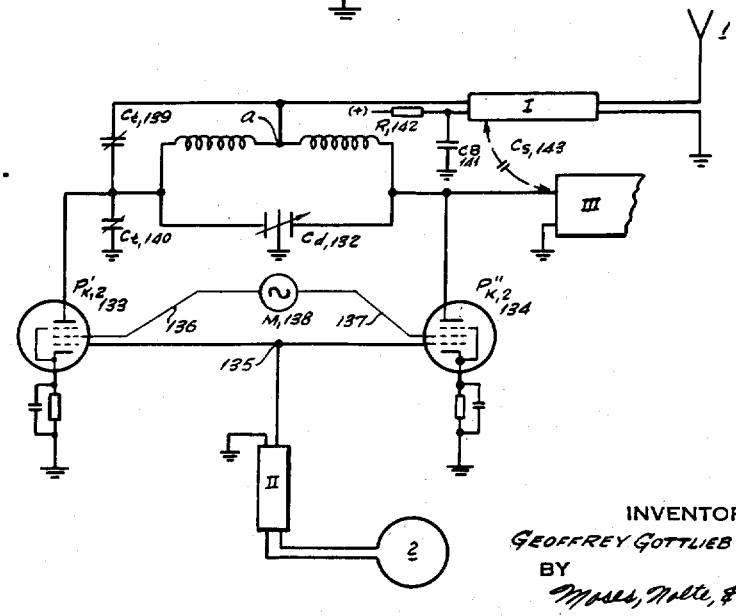
FIG. 19 is a circuit diagram of an embodiment of the bridge type coupling.

The classification (C) of "orthogonal-input" or, otherwise known as hybrid-input networks is shown, in principle, in FIG. 18, while FIG. 19, shows a practical circuit diagram as one of the specific embodiments of this type of coupling structure.

FIG. 18, in particular, is a coupling structure of the "equal arm bridge network" type also mentioned in the above M.I.T. reference. In connection with this invention $Z_1$ and $Z_2$ therein may be considered as being the "transfer impedances," hence, again, system functions, $K_{21,+jw}$ and $K_{12,+jw}$ of the active networks I and II designed so as to conform with the principal phase alignment condition (mm) of this invention. If the said system functions are referred, generally, to the equal bridge arm network of FIG. 18 they will become zero. An analysis of the network shows that the weighting factors become linear functions of the input potentials $E_1$ and $E_2$ as follows:

$$(13)\qquad E_3=\frac{Z}{2}\cdot\left(\frac{E_1}{Z+Z_1}+\frac{E_2}{Z+Z_2}\right)$$

in which $$\frac{Z}{2}\cdot\left(\frac{1}{Z+Z_1}\right)=a$$

and $$\frac{Z}{2}\cdot\left(\frac{1}{Z+Z_1}\right)=b$$

are the weighting factors, already referred to. For them to be equal we obviously must meet with the condition of symmetry between the active networks, I and II:

$$(13a)\qquad Z_1=Z_2$$

which requirement demands, respectively, equal input and output terminations of the active networks; i.e., again the networks I and II must be designed so as to meet with the principal phase alignment condition (mm).

In FIG. 19, the idea of an equal arm bridge network arrangement shown in FIG. 18 is combined with the use of a "balanced modulator circuit" as part of the directional antenna network II.

A directional or loop antenna 2 feeds the antenna amplifying network II in any of the ways heretofore described the R.F. output of the latter of which feeds the control grids of pentode amplifiers $P'_{k,2}$ and $P''_{k,2}$, respectively, at the common junction 135 in parallel Screen grids 136, 137 of the two pentodes are connected to a modulator voltage source of low frequency, M138, respectively, in push-pull fashion. The differential output between these two signals appear across the nodes b and c of a resonance tuned circuit comprising the two coil halves, $$\frac{L}{2}130 \text{ and } \frac{L}{2}131$$

and the differential variable tuning condenser, $C_{d132}$.

The non-directional antenna 1 feeds the antenna amplifying network I the output termination of which is "separated" or isolated from the node a of said resonance tuned circuit $L,C_d$ either by means of a transformer or a vacuum tube.

The receiver input circuit of network III connects to the output node c. The input capacity $C_{s3}$ to ground of this network may be balanced from node b to ground by means of a trimmer condenser $C_{t140}$, while stray capacitance $C_{s143}$ between networks I and III may be balanced by means of another trimmer condenser $C_{t139}$ between the two nodes b and a. The node a at the junction of the two coil halves $$\frac{L}{2}130 \text{ and } \frac{L}{2}131$$

and the ground, in other words, forms the R.F. input to the bridge of the sense antenna network I which is "orthogonal," both, geometrically and electrically, with respect to the R.F. input to the nodes b and c of the directional antenna network II. Resistor R,142 and capacitor $C_{B,141}$ is a filter combination for the plate supply to the modulator-pentodes $P'_{k,2}$ and $P''_{k,2}$.

Keeping the said stray capacitances as small as possible, the bridge will remain balanced over an extended frequency range at each and every setting of the resonance tuned circuit $L,C_d$. This circuit may be readily ganged with other resonance-tuned circuits comprised in networks I, II and III, same as was shown in the previously explained practical circuit arrangements, in order to result in the required single dial frequency control of the direction finder.

The sustained condition of balance over a frequency range, of course, corresponds with rendering ineffective the individual system functions, $K_{12.+jw}$ and $K_{21.+jw}$ in accordance with the first stipulation of the functional requirement I, while the second stipulation, $$K_{31,+jw}=K_{32,+jw}$$

of said functional requirement is automatically met with by the symmetry of the coupling structure as well as that of the networks, respectively, I and II.

There are still other coupling structures of the direct coupled variety possible which can be classified to the "true series feed systems" as exemplified by the mathematical equivalent shown in FIG. 3C and further illustrated by the practical example of the inductively coupled variety of such systems shown in FIG. 6. In using series addition or subtraction, however, the effects of stray impedances, usually capacitances, can no longer be "balanced out" as is conveniently done in the case of the classification (A) of single systems shown in FIG. 14 and FIG. 17, for instance, unless special arrangements, similar to the method using the special transformer in FIG. 6 are resorted to. In other words, the said stray capacitances, instead of being balanced, should be "neutralized."

What I claim is:

1. Radio direction finder of the class described, comprising: a directional antenna network; a [non-directional] *second* antenna network; a [compass] receiver network and coupling means interconnecting said directional antenna network, said [non-directional] *second* antenna network and said [compass] receiver network, said coupling means comprising means for rendering ineffective over a given frequency range one of the three possible generalized, individual coupling pairs among the three networks.

2. Radio direction finder in accordance with claim 1, in which said directional antenna network and said [non-directional] *second* antenna network are both active networks each energized from a power supply for overcoming the effects of energy losses therein, and wherein the losses provided for by the power supply are substantially equally distributed between said two antenna networks.

3. Radio direction finder in accordance with claim 1, and in which said receiver network comprises resonant circuit means for minimizing the magnitude of current flow therein.

4. Radio direction finder in accordance with claim 1 and in which the output circuit of one of said antenna networks is tuned to exact resonance.

5. Radio direction finder in accordance with claim 1, further comprising phase shifting means for providing a phase quadrature relationship between the output currents of the antenna networks.

6. Radio direction finder in accordance with claim 1, in which said antenna networks are symmetrically arranged, the respective output impedance angles of said antenna networks being substantially equal.

7. Radio direction finder in accordance with claim 1, in which said coupling means comprises a coupling transformer with two crossed coils and a third winding, two of said three coils being mounted upon a common coil form and one of said crossed coils being movable with respect to the other crossed coil, whereby the relative angular position between said crossed coils may be varied by rotation with respect to each other in order to obtain such adjustment as is necessary to eliminate all influence from one said crossed coil to the other.

8. Radio direction finder in accordance with claim 7, in which one end of each of said crossed coils is grounded.

9. In combination with a radio direction finder comprising a directional antenna network; a non-directional antenna network; a receiver network; and coupling means coupling both of said antenna networks to said receiver network and providing three individual bi-directional coupling paths among said three networks; the provision of decoupling means effective with respect to any two of said networks, said decoupling means rendering ineffective one of said three individual bi-directional coupling paths whereby a combined signal is applied by said two antenna networks to said receiver network, said signal having a directional characteristic of substantially true *cardioid* [cardiod] shape.

10. The combination according to claim 9, in which said coupling means comprises a three winding transformer and wherein said decoupling means includes a coupling path in said transformer which links one of said three windings to one of the other of two of said windings but substantially not to the third of said three windings.

11. The combination according to claim 10, in which said transformer further comprises means providing a coupling path in said transformer which is adjustable to permit the minimization of said non-effective linkage to said third of said three windings.

12. The combination according to claim 9, wherein said coupling means comprises two coupling devices, each coupling one of two of said networks to a third one of said networks, and in which said decoupling means comprises a coupling between said two coupling devices which effectively opposes another coupling in the same path between said two coupling devices.

13. A radio direction finder tunable over an extended frequency range comprising a directional antenna network a [non-directional] *sense* antenna network, a receiver network, means for tuning said networks in unison throughout an extended frequency range, and coupling means for coupling both of said antenna networks to said receiver network, so that there are three possible coupling pairs among said networks, said coupling means including means for rendering ineffective one of the three possible coupling pairs in comparison with the other two coupling pairs and maintaining the ratio between the other two coupling pairs substantially constant throughout said frequency range.

14. A radio direction finder tunable over an extended frequency range comprising a directional antenna network, a [non-directional] *second* antenna network; a receiver network; said antenna networks including tunable amplifiers; means for tuning said antenna networks throughout said frequency range in unison; coupling means for coupling both of said antenna networks to said receiver network so that the coupling among said networks consists of three possible coupling pairs; and means for rendering one of the three coupling pairs negligible in comparison with the other two coupling pairs throughout said frequency range and for causing the phase shifts in the two antenna networks to have a constant difference throughout said frequency range and for causing the gains of the two antenna networks to have a substantially constant ratio throughout said frequency range.

15. A radio direction finder according to claim 14, wherein said antenna networks are connected to first and second output terminals respectively, a tuned circuit connected between said terminals symmetrically with respect to ground, said antenna networks being adjusted to supply signals to their respective output terminals which are in the same phase and which are also of equal amplitude when the directional antenna of the directional antenna network is oriented to receive a maximum signal, the receiver network being coupled to said tuned circuit symmetrically with respect to said first and second terminals.

16. A radio direction finder according to claim 15, wherein said receiver network is connected to a midpoint between said first and second terminals, and a parallel resonant circuit connected between said midpoint and ground, and means for tuning said tuned circuit and said parallel resonant circuit in unison with said tunable amplifiers.

17. A radio direction finder according to claim 15, wherein said directional antenna network includes a balanced modulator and a source of low frequency modulation signals connected to said balanced modulator.

18. A radio direction finder according to claim 15, wherein said antenna networks include heterodyne circuits and said tuned circuit is tuned to the intermediate frequency of said heterodyned circuits.

19. A radio direction finder according to claim 18, wherein said heterodyne circuits each include an output electron tube connected to said first and second terminals respectively, said electron tubes having cathodes directly connected together and a parallel resonant circuit tuned to the intermediate frequency being connected between said cathodes and ground.

20. A radio direction finder according to claim 14, wherein said coupling means comprises a first and second electron tube cathode follower circuit connected to the output of said antenna networks, respectively, the cathode of the cathode follower electron tube being directly connected together and connected to ground through a parallel resonant circuit, and means coupling the receiver network to said parallel resonant circuit.

21. A radio direction finder according to claim 20, wherein said cathode follower circuits are heterodyne circuits and said parallel resonant circuit is tuned to an intermediate frequency.

22. A radio direction finder according to claim 14, wherein said coupling means comprises a resonant bridge circuit having pairs of adjacent arms of equal impedance, said bridge circuit having one pair of opposite terminals connected to the output of one antenna network and its other pair of opposite terminals connected to the output of the other antenna network, the receiver network being coupled to said bridge circuit.

23. A radio direction finder comprising a [non-directional] *first* antenna network, a directional antenna network, a receiver network and coupling means interconnecting said antenna networks and said receiver network, said coupling means comprising means for rendering ineffective over a given frequency range, one of the three possible individual coupling pairs among the three networks, said antenna networks having equal input impedances and equal output impedances and output connections including series resistors connected to a common output terminal, said receiver network having an input terminal and said coupling means including a negative feedback amplifier connected between the common output terminal and the receiver input terminal and including a resistive feedback connection between said terminals.

No references cited.